(12) United States Patent
Shinohara et al.

(10) Patent No.: US 8,983,713 B2
(45) Date of Patent: Mar. 17, 2015

(54) REMOTE MONITORING TERMINAL DEVICE FOR MOBILE WORK VEHICLE OR VESSEL

(71) Applicant: Yanmar Co., Ltd., Osaka (JP)

(72) Inventors: Yoshihiko Shinohara, Osaka (JP); Hirofumi Sakamoto, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 0 days.

(21) Appl. No.: 14/355,942

(22) PCT Filed: Oct. 24, 2012

(86) PCT No.: PCT/JP2012/077434
§ 371 (c)(1),
(2) Date: May 2, 2014

(87) PCT Pub. No.: WO2013/080712
PCT Pub. Date: Jun. 6, 2013

(65) Prior Publication Data
US 2014/0324279 A1   Oct. 30, 2014

(30) Foreign Application Priority Data

Dec. 2, 2011   (JP) .................................. 2011-264967

(51) Int. Cl.
| | |
|---|---|
| *G01M 17/00* | (2006.01) |
| *G07C 5/00* | (2006.01) |
| *H04Q 9/00* | (2006.01) |
| *G05B 23/02* | (2006.01) |

(52) U.S. Cl.
CPC .. *G07C 5/00* (2013.01); *H04Q 9/00* (2013.01); *H04Q 2209/86* (2013.01); *G05B 23/0216* (2013.01)
USPC ......................................... 701/31.5; 700/112

(58) Field of Classification Search
CPC .................................. G07C 5/00; G08C 17/02
USPC .................................. 701/31.5; 700/112, 113
See application file for complete search history.

(56) References Cited

U.S. PATENT DOCUMENTS

| | | | |
|---|---|---|---|
| 6,119,074 A | 9/2000 | Sarangapani | |
| 2003/0054808 A1* | 3/2003 | Watanabe et al. ............ | 455/414 |
| 2008/0167758 A1 | 7/2008 | Louch et al. | |
| 2014/0247138 A1 | 9/2014 | Kusuno et al. | |

FOREIGN PATENT DOCUMENTS

| | | |
|---|---|---|
| EP | 1273723 A | 1/2003 |
| EP | 2749977 A1 | 7/2014 |

(Continued)

OTHER PUBLICATIONS

International Search Report dated Dec. 25, 2012, issued for PCT/JP2012/077434.

(Continued)

*Primary Examiner* — Thomas G Black
*Assistant Examiner* — Luke Huynh
(74) *Attorney, Agent, or Firm* — Locke Lord LLP

(57) ABSTRACT

Disclosed is a remote monitoring terminal device for a mobile work vehicle or vessel, capable of informing the user of maximum, minimum, and average values for each sensor and a turn-on count of a switch. The remote monitoring terminal device includes: connection terminals; a data abridging control section for computing minimum, maximum, and average values of data collected over a period from a startup to the latest data acquisition and of actual operation data on actual operation and an occurrence count and durations of a predetermined event, on the basis of operation-state data acquired via the connection terminals and stored in a data storage section; and a communications section. In response to a manual turn-off of a startup switch of the mobile work vehicle or vessel, the data abridging control section transmits data stored in the data storage section, to the remote monitoring device via the communications section.

2 Claims, 16 Drawing Sheets

(56) References Cited

FOREIGN PATENT DOCUMENTS

| | | |
|---|---|---|
| JP | 2007-228373 A | 9/2007 |
| JP | 4689136 B2 | 5/2011 |
| JP | 2011-176416 A | 9/2011 |

OTHER PUBLICATIONS

Supplementary European Search Report dated Sep. 30, 2014, issued for the European patent application No. 12853377.5.

* cited by examiner

| Connection Terminal | Item | Output Element Qa |
|---|---|---|
| T1 | 1 | Thresh Switch |
| | 2 | Harvest Switch |
| | 3 | Auger Clutch State |
| | 4 | Engine-related Warning (Charge) |
| | 5 | Engine-related Warning (Hydraulic Pressure) |
| | 6 | Engine-related Warning (Water Temperature) |
| | 7 | Engine-related Warning (Overload) |
| | 8 | Engine-related Warning (Clogged Air Cleaner) |
| | 9 | Engine-related Warning (Clogged Rice Straw Discharger/Cutter) |
| | 10 | Engine-related Warning (Emergency Engine Shutdown) |
| | 11 | Clogged Harvest Pathway |
| | 12 | Counter Input Belt Slip |
| | 13 | Harvest Rotation Warning |
| | 14 | HST Irregularity Warning |
| | 15 | Backward Switch |
| | 16 | Low-speed-gear Harvest State |
| | 17 | High-speed-gear Harvest State |
| | 18 | High-speed-cutting Harvest State |
| | 19 | Quick Harvest State |
| | 20 | Feed-depth Sensor (L) |
| | 21 | Feed-depth Sensor (M) |
| | 22 | Feed-depth Sensor (H) |
| | 23 | Economic Mode |
| | 24 | HST Subtransmission State |
| | 25 | Feed Chain Clutch Solenoid |
| | 26 | Slow-rising Harvest Switch |
| | 27 | Slow-falling Harvest Switch |
| | 28 | Fast-rising Harvest Switch |
| | 29 | Fast-falling Harvest Switch |
| | 30 | Autolift switch |
| | 31 | Autosetting switch |
| | 32 | Quick Harvest Pedal |

| Connection Terminal | Item | Output Element Qb |
|---|---|---|
| T2 | 1 | Idling Engine Rotation |
| | 2 | Working Engine Rotation |
| | 3 | Idling Engine Load Ratio |
| | 4 | Working Engine Load Ratio |
| | 5 | Idling Vehicle Speed |
| | 6 | Working Vehicle Speed |
| | 7 | Idling Swing Motor Rotation |
| | 8 | Working Swing Motor Rotation |
| | 9 | Calculated Harvest Output Rotation Value |
| | 10 | Harvest Height Data |
| | 11 | Secondary Rotation |
| | 12 | Threshing Chamber Rotation |
| | 13 | Processing Chamber Rotation |
| | 14 | Vehicle Height Data (Right) |
| | 15 | Vehicle Height Data (Left) |
| | 16 | Incline Sensor |
| | 17 | Screening Flow Rate |
| | 18 | Amount of Remaining Fuel |
| | 19 | Harvest Position Sensor |
| | 20 | Battery Voltage |

| Connection Terminal | Item | Output Element Qc |
|---|---|---|
| T3 | 1 | Integrated Time |
| | 2 | |
| | 3 | |
| | 4 | |

| Connection Terminal | Item | Output Element Qd |
|---|---|---|
| T4 | 1 | Error Information 1 |
| | 2 | Error Information 2 |
| | 3 | Error Information 3 |
| | 4 | Error Information 4 |

| Connection Terminal | Item | Output Element Qe |
|---|---|---|
| T5 | 1 | Switch 1 |
| | 2 | Switch 2 |
| | 3 | Switch 3 |
| | 4 | Switch 4 |
| | 5 | Switch 5 |
| | 6 | Switch 6 |
| | 7 | Switch 7 |
| | 8 | Switch 8 |

| Connection Terminal | Item | Output Element Qf |
|---|---|---|
| T6 | 1 | Battery Voltage |
| | 2 | Board Temperature |

Fig.4

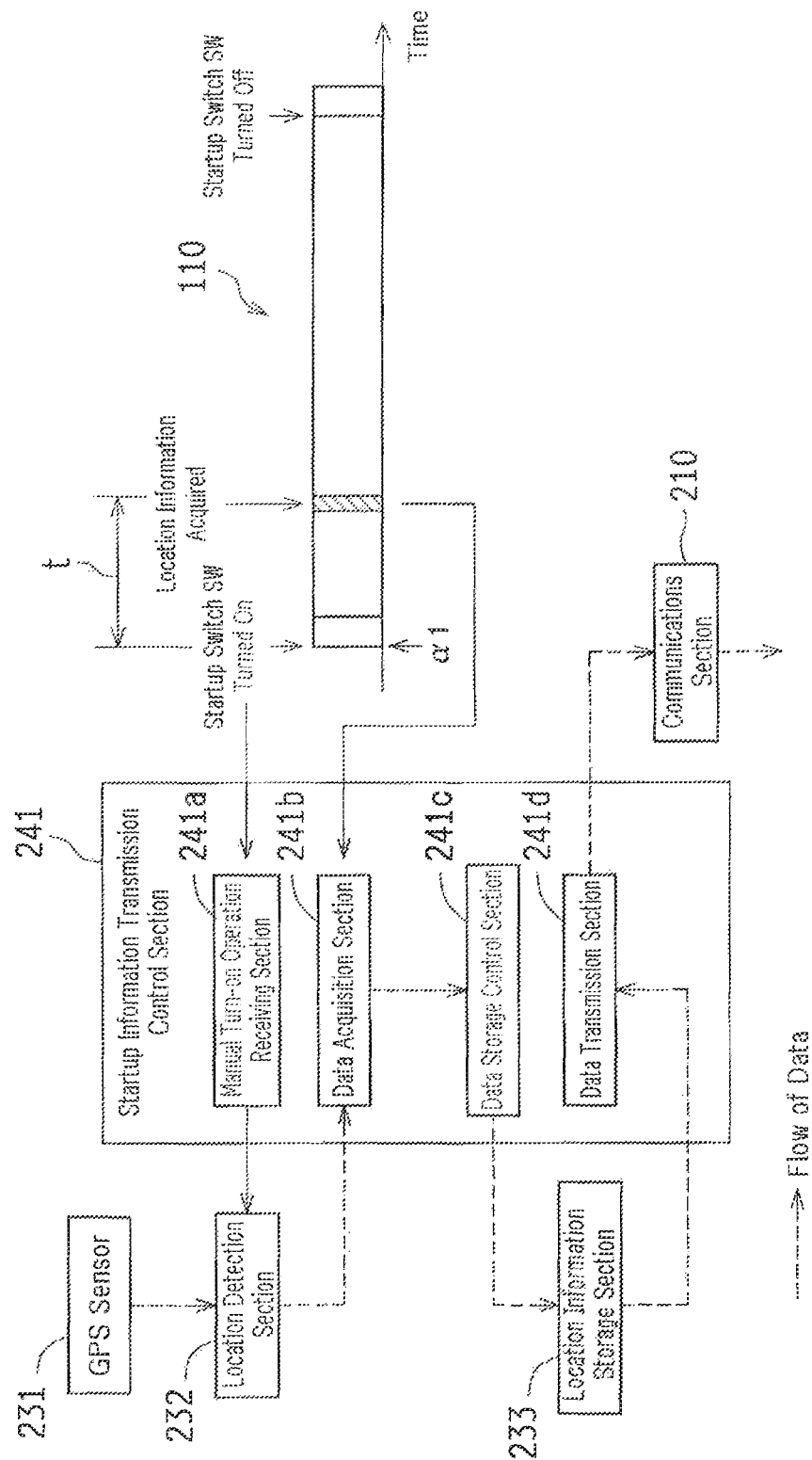
Fig.5 (Startup Information Transmitting Function)

Fig.6

| Information | Date & Time | Location Information ||
| --- | --- | --- | --- |
| | | Latitude | Longitude |
| Upon Startup | 2010/9/13 13:53:09 | N043426133 | E141568373 |
| Upon Shutdown | 2010/9/13 16:41:35 | N043426387 | E141567884 |

(Third Data Storage Section Used in First Storage Control Arrangement) 263

| Binary Information | Occurrence of Event | |
| --- | --- | --- |
| | Turn-on Count | ON Duration (s) |
| Thresh Switch | 4 | 5757 |
| Harvest Switch | 5 | 5733 |
| Auger Clutch State | 9 | 680 |
| Engine-related Warning (Charge) | 1 | 0 |
| Engine-related Warning (Hydraulic Pressure) | 1 | 1 |
| Engine-related Warning (Water Temperature) | 0 | 0 |
| Engine-related Warning (Overload) | 6 | 3 |
| Engine-related Warning (Clogged Air Cleaner) | 0 | 0 |
| Engine-related Warning (Clogged Rice Straw Discharger/Cutter) | 0 | 0 |
| Engine-related Warning (Emergency Engine Shutdown) | 0 | 0 |
| ... | ... | ... |

| Detected Value Information | Average | Maximum | Minimum |
| --- | --- | --- | --- |
| Engine Rotation | 1478 | 2671 | 224 |
| Engine Load Ratio | 13 | 96 | 0 |
| Vehicle Speed | 0.11 | 1.83 | 0 |
| ... | ... | ... | ... |

| Integrated Information | Upon Startup | Upon Shutdown |
| --- | --- | --- |
| Integrated Time | 150 | 153 |
| ... | ... | ... |
| ... | ... | ... |
| ... | ... | ... |

Fig.12

(Fifth Data Storage Section Used in Second Storage Control Arrangement)   265

| Detected Value Information | Average | Maximum | Minimum |
|---|---|---|---|
| Working Engine Rotation | 2591 | 2721 | 2102 |
| Working Engine Load Ratio | 57.5 | 100 | 0 |
| Working Vehicle Speed | 1.11 | 3.15 | 0 |
| ... | ... | ... | ... |

| Type of Data on Operation State | Operation Selection | |
|---|---|---|
| Engine Rotation | ☑ Operation/Idling | ☑ Actual Operation |
| Engine Load Ratio | ☐ Operation/Idling | ☑ Actual Operation |
| Vehicle Speed | ☑ Operation/Idling | ☐ Actual Operation |
| ........... | ............ | ....... |
| ........... | ............ | ....... |
| ........... | ............ | ....... |

γ1 [OK]   γ2 [Go Back]

Fig. 16 (Operation Information Transmission Control Section in Second Storage Control Arrangement)

REMOTE MONITORING TERMINAL DEVICE FOR MOBILE WORK VEHICLE OR VESSEL

TECHNICAL FIELD

The present invention relates to a remote monitoring terminal device for mobile work vehicles (e.g., construction and agricultural machinery) or vessels (e.g., pleasure crafts and fishing boats), the remote monitoring terminal device being mounted to such a mobile work vehicle or vessel for communication with a remote monitoring device to enable the mobile work vehicle or vessel to be remotely monitored by the remote monitoring device.

BACKGROUND ART

Remote monitoring systems have been known which enable communications between a remote monitoring device installed at a remote monitoring center and a remote monitoring terminal device mounted to, for example, a mobile work vehicle for monitoring of the mobile work vehicle.

For example, Patent Document 1 discloses an arrangement where measured data collected over a duration in which quantities of machine state, such as engine rotation, pump discharge pressure, and operating pilot pressure, for the work operation of a work machine satisfy predetermined conditions representing actual operation is transmitted to a base station when a power-on switch (engine key) for the work machine is turned off

CITATION LIST

Patent Literature

Patent Document 1: Japanese Patent Publication No. 4689136

SUMMARY OF THE INVENTION

Problems to be Solved by the Invention

However, the arrangement described in Patent Document 1 is not capable of informing the user of maximum, minimum, and average values for each sensor, a turn-on count of a switch, etc. despite that the arrangement is capable of informing the user of a real operating time (e.g., work time, engine running time, and time during which a hydraulic pump is generating a high pressure) of the work machine.

Accordingly, the present invention has an object to provide a remote monitoring terminal device for a mobile work vehicle or vessel, the remote monitoring terminal device being mounted to a mobile work vehicle or vessel for communication with a remote monitoring device to enable the mobile work vehicle or vessel to be remotely monitored by the remote monitoring device, in order to inform the user of, for example, maximum, minimum, and average values for each sensor and a turn-on count of a switch.

Solution to Problem

The present invention, to address the problems, provides a remote monitoring terminal device for a mobile work vehicle or vessel, the remote monitoring terminal device being mounted to a mobile work vehicle or vessel for communication with a remote monitoring device to enable the mobile work vehicle or vessel to be remotely monitored by the remote monitoring device, the remote monitoring terminal device including:

connection terminals for feeding data on an operation state of the mobile work vehicle or vessel;

a data abridging control section including a first storage control arrangement and a second storage control arrangement, the first storage control arrangement acquiring at predetermined intervals, and temporarily storing in a data storage section, the data on the operation state fed via the connection terminals, computing minimum, maximum, and average values of part of the data on the operation state collected over a period from a startup to a latest data acquisition and an occurrence count and durations of a predetermined event, all on the basis of the data stored at the predetermined intervals, and temporarily storing the computed minimum, maximum, and average values and the computed occurrence count and durations in the data storage section, the second storage control arrangement computing minimum, maximum, and average values of actual operation data and an occurrence count and durations of the predetermined event on the basis of the data temporarily stored in the data storage section at the predetermined intervals, and temporarily storing the computed minimum, maximum, and average values and the computed occurrence count and durations in the data storage section, the actual operation data being part of the data on the operation state collected over a period from a startup to a latest data acquisition, the part being related to actual operation; and a communications section for communication with the remote monitoring device, wherein the data abridging control section transmits the minimum, maximum, and average values and the occurrence count and durations of the predetermined event, all stored in the data storage section, to the remote monitoring device via the communications section in response to a manual turn-off of a startup switch of the mobile work vehicle or vessel.

Actual operation in the context of the present invention refers to a state of the mobile work vehicle or vessel in which the mobile work vehicle or vessel is in operation for certain practical purposes (e.g., traveling, passenger or cargo transport, or any other practical job). Examples of actual operation may include a state in which the mobile work vehicle or vessel is in operation and not idling (not standing by).

The present invention enables transmission of the data needed to inform the user of the minimum, maximum, and average values of part of the data on the operation state collected over a period from a startup to a latest data acquisition and transmission of the occurrence count and durations of the predetermined event to the remote monitoring device in response to a manual turn-off of a startup switch of the mobile work vehicle or vessel. Therefore, the user is capable of being informed of, for example, the maximum, minimum, and average values for each sensor and the turn-on count of the switch.

The mobile work vehicle or vessel may be in some cases in operation, but idling (standing by) and not in actual operation (e.g., traveling, passenger or cargo transport, or any other practical job). According to the present invention, however, since the data abridging control section includes the second storage control arrangement, the minimum, maximum, and average values of the actual operation data and the occurrence count and durations of the predetermined event can he transmitted to the remote monitoring device. Therefore, the user is capable of being informed of minimum, maximum, and average values, an occurrence count, and durations of a predetermined event of a particular type of data on a running state or a particular set of the actual operation information.

Actual operation information in the context of the present invention refers to, for example, manual operation information on the operation of predetermined manual operation sections and information from various sensors. Examples of the predetermined manual operation section may include levers, switches, or like manual operation sections manually operated for the mobile work vehicle or vessel to travel, transport passenger or cargo, or perform any other practical job (specifically, in the case of the mobile work vehicle being a combine harvester, the predetermined manual operation section may be a harvest switch or a harvesting-section lifting lever for harvesting section). Examples of the various sensors may include sensors which output a signal indicating that the mobile work vehicle or vessel is traveling, transporting passenger or cargo, or performing any other practical job (specifically, in the case of the mobile work vehicle being a combine harvester, the sensor may be an engine rotation sensor, a temperature sensor, a lifting sensor, or a swing angle sensor).

In the present invention, for example, the data abridging control section specifies, for each type of data on the operation state, an operation selection as to whether the first storage control arrangement is activated alone from the first and second storage control arrangements, the second storage control arrangement is activated alone, or both the first and second storage control arrangements are activated, and activates at least either one of the first and second storage control arrangements on the basis of the specified operation selection.

According to this feature, the data obtained from at least either one of the first and second storage control arrangements can be transmitted to the remote monitoring device in accordance with the operation selection specified for each type of data on the operation state.

Advantageous Effects of the Invention

As described above, the remote monitoring terminal device for a mobile work vehicle or vessel in accordance with the present invention is capable of informing the user of maximum, minimum, and average values for each sensor, a turn-on count of a switch, etc. of the mobile work vehicle or vessel.

BRIEF DESCRIPTION OF DRAWINGS

FIG. 4 is a table showing concrete examples of output elements for various connection terminals in a case where the agricultural machine is a combine harvester.

FIG. 5 is a schematic operation diagram of an operation process for a startup information transmitting function implemented by a startup information transmission control section in a control section.

FIG. 6 is a schematic illustration of data structure in a location information storage section employed by a startup information transmission control section.

FIG. 11 is a schematic data structure table showing exemplary data for a third data storage section for use by the first storage control arrangement of the operation information transmission control section.

FIG. 12 is a schematic data structure table showing exemplary data for a filth data storage section for use by the second storage control arrangement of the operation information transmission control section.

FIG. 13 is an illustration of an exemplary operation-selecting setup screen on a setup section.

DESCRIPTION OF EMBODIMENTS

The following will describe an embodiment of the present invention in reference to attached drawings by taking a combine harvester, tiller, rice transplanter, or like agricultural machinery as an example of the mobile work vehicle or vessel.

Overall Arrangement of Remote Monitoring System

Figure 1:
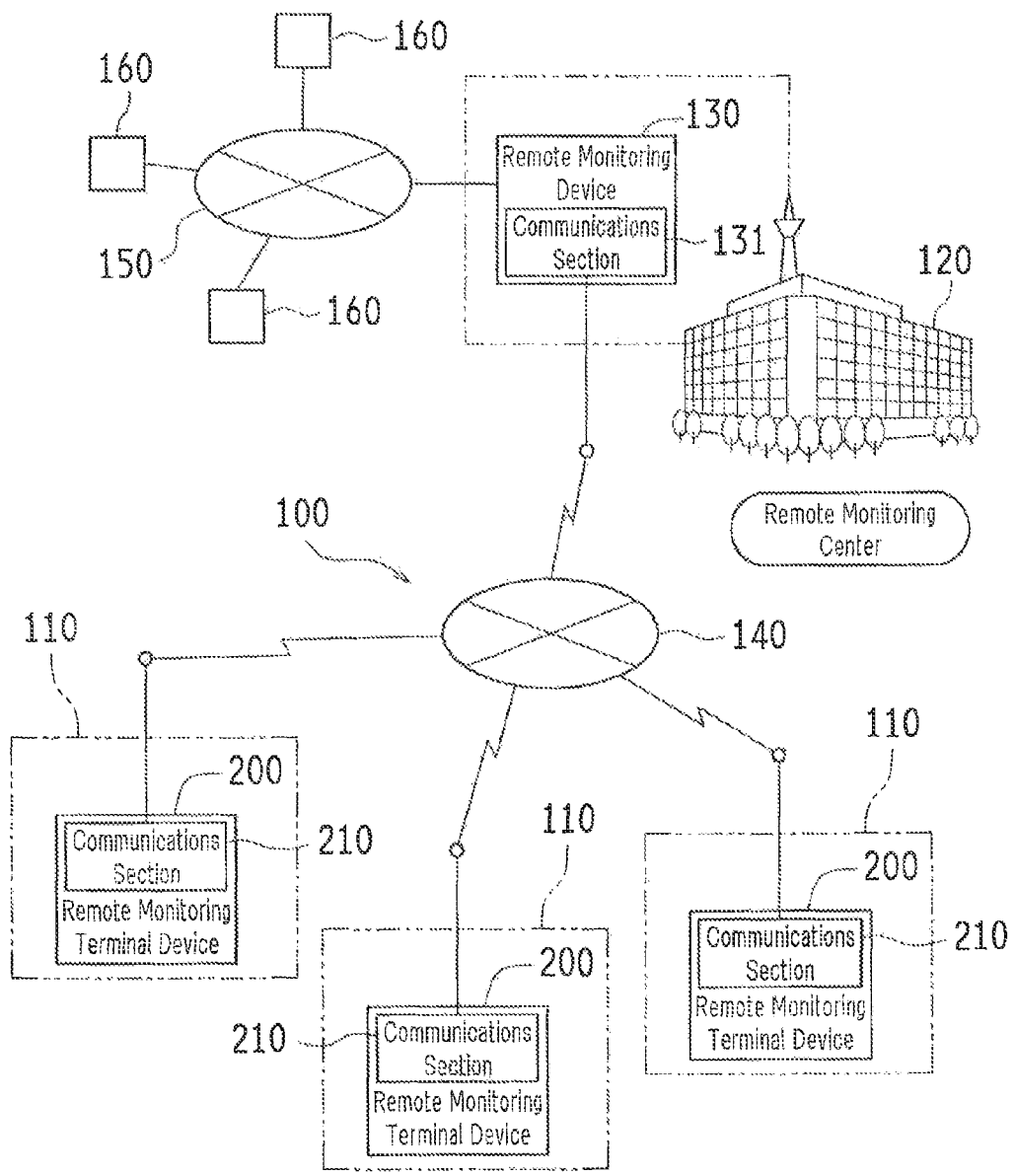
FIG. 1 is a schematic illustration of a remote monitoring system for remote monitoring of agricultural machines.
Figure 2:
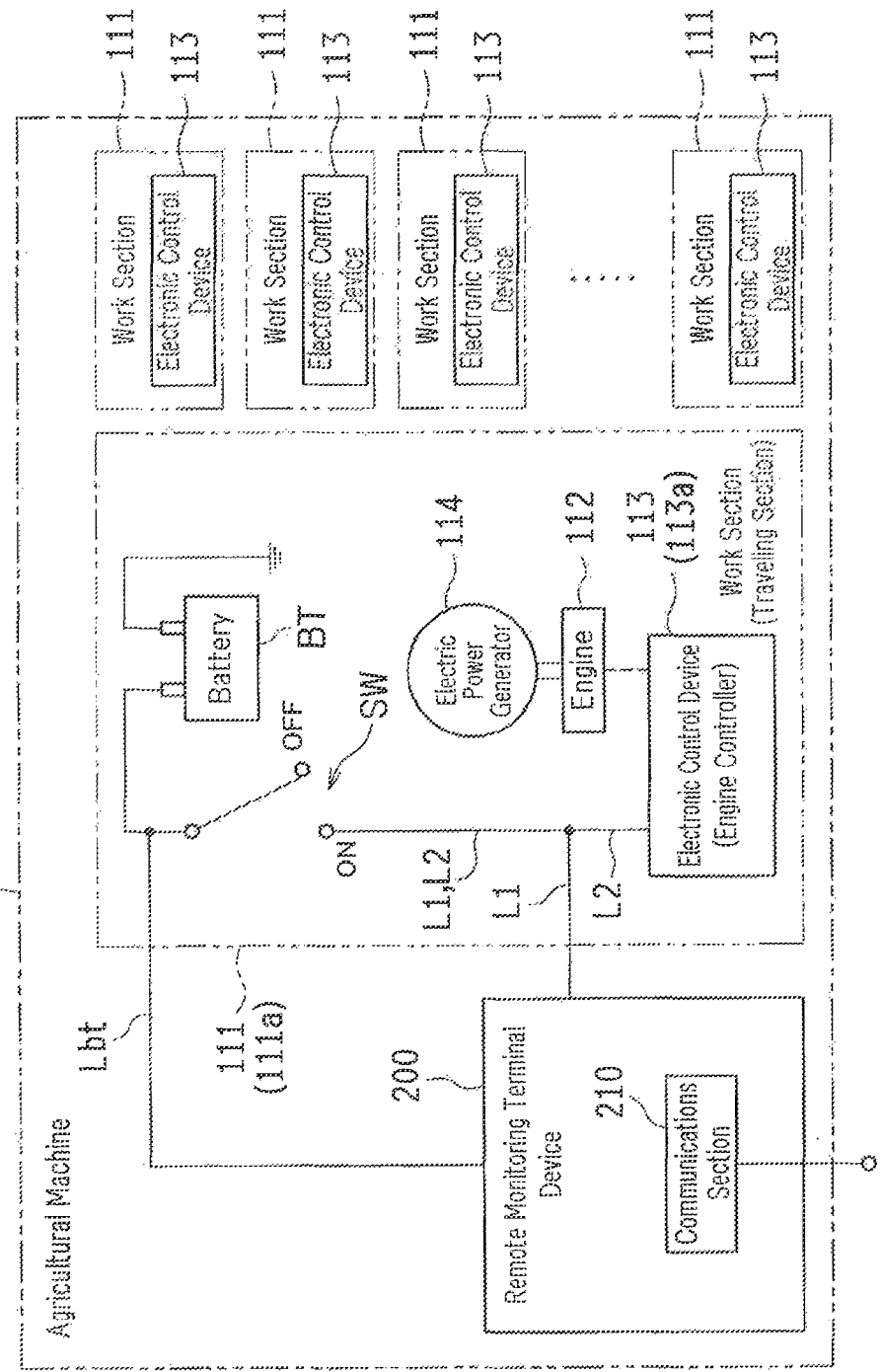
FIG. 2 is a schematic block diagram of the arrangement of an agricultural machine with a remote monitoring terminal device.
Figure 3:
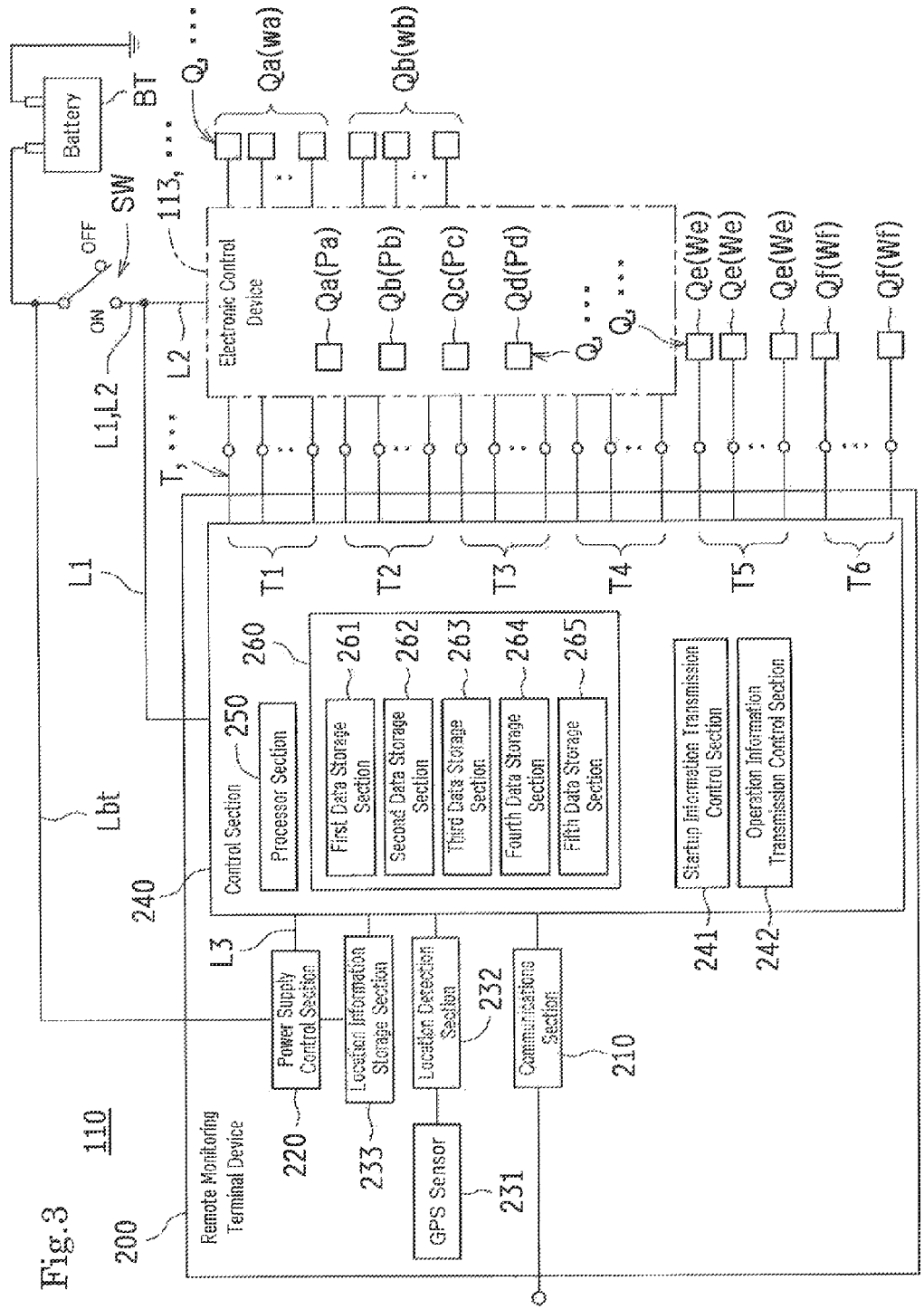
FIG. 3 is a schematic block diagram of the arrangement of a remote monitoring terminal device for an agricultural machine.

FIG. 1 is a schematic illustration of a remote monitoring system 100 for remote monitoring of agricultural machines 110. FIG. 2 is a schematic block diagram of the arrangement of an agricultural machine 110 with a remote monitoring terminal device 200. FIG. 3 is a schematic block diagram of the arrangement of a remote monitoring terminal device 200 for an agricultural machine 110.

As illustrated in FIG. 1, the remote monitoring system 100 includes at least one (in this case, two or more) agricultural machine (exemplary mobile work vehicle) 110, remote monitoring terminal devices 200, one for each agricultural machine 110, and a remote monitoring device 130 connected to the remote monitoring terminal devices 200 over a communications network 140.

The remote monitoring device 130 is installed at a remote monitoring center 120 located remotely from the agricultural machines 110 and collects and stores data on the operation states of the agricultural machines 110. The remote monitoring device 130 is connected to terminal devices 160 (e.g., personal computers, tablet computers, and mobile terminals) over a network 150 (e.g., a LAN (local area network) or the Internet). The device 130 feeds collected data to the terminal devices 160) to make the data available to users, for example, the users and sales agents of the agricultural machines 110.

Specifically, each remote monitoring terminal device 200 and the remote monitoring device 130 include respectively a communications section 210 and a communications section 131 (specifically, communications modules) and are connected to each other over the communications network 140 through the communications sections 210 and 131 to enable information exchange between the remote monitoring terminal device 200 and the remote monitoring device 130. Thus, the remote monitoring device 130 enables the user at the remote monitoring center 120 to remotely monitor the agricultural machines 110.

The communications network 140 may be a wired communications network, a wireless communications network, or a combination of a wired and wireless communications networks. The communications network 140 is typically a public line network provided by a telecommunications carrier, for example, a public line network that enables communications between fixed-line phones, mobile phones, and like terminals.

As illustrated in FIG. 2, each agricultural machine 110 includes at least one (in this case, two or more) work section 111 and a remote monitoring terminal device 200. The work section 111 may be, for example, a traveling section a harvesting section, or a threshing section when the agricultural machine is a combine harvester.

Each work section 111 is equipped with an electronic control device (specifically, controller) 113 which instructs various actuators (not shown) to control the operation state of the work section 111 in a suitable manner. The electronic control devices 113 are capable of mutual data transfer in compliance with the CAN (Controller Area Network) standards.

Specifically, each electronic control device 113 controls the operation state of an associated work section 111 on the basis of detected value information (signals) detected by various sensors (detailed later) and on/off information of various switches (detailed later) in the work section 111. The electronic control device 113 evaluates, as needed, the presence/absence of irregularities, for example, whether there has occurred a breakdown/malfunction, in the agricultural machine 110. If there has occurred an irregularity, the device 113 generates error information (specifically an error code) in accordance with the irregularity.

A work section 111 (traveling section 111a), or one of the work sections 111 which actuates an engine 112, includes the engine 112, an electronic control device 113 (engine controller 113a), an electric power generator 114, and a startup switch SW and may further include a battery BT. The electronic control device 113 (engine controller 113a) monitors the rotational speed, load, and other conditions of the engine 112 to instruct a fuel system on, for example, an optimal injection pressure and an injection period for the control of the entire engine. The electronic control device 113 (engine controller 113a) controls manual startup/suspension operations and controls an operation state through activation of the engine 112, as well as controls the operation. of the work section 111 (traveling section 111a).

After the work section 111 (traveling section 111a) is started (when the engine 112 is operating), the battery BT is charged, as needed, by an electric power supply from the electric power generator 114.

The startup switch SW of the work section 111 (traveling section 111a) is a toggling switch selectively toggling between a power-supply-on state and a power-supply-off state. The battery BT, in the power-supply-on state, is allowed to supply electric power to a control section 240 in the remote monitoring terminal device 200 and to the electronic control device 113 (engine controller 113a) (see FIG. 3), whereas in the power-supply-off state, the battery BT is inhibited from supplying electric power to the control section 240 in the remote monitoring terminal device 200 and to the electronic control device 113 (engine controller 113a).

Specifically, the battery BT is connected both to a power supply connecting line L1 connected to the control section 240 in the remote monitoring terminal device 200 and to a power supply connecting line L2 connected to the electronic control device 113 (engine controller 113a) via the startup switch SW.

In this example, the startup switch SW is a "key switch." The startup switch SW has an ON terminal connected to the power supply connecting lines L1 and L2 while the engine 112 is operating and an OFF terminal used while the startup switch SW is being turned off.

As will be detailed later, the battery BT is connected to a power supply control section 220 in the remote monitoring terminal device 200 via a power supply connecting line Lbt to periodically start up power supply, no matter whether the startup switch SW is being turned on or off. Hence, the power supply control section 220 in the remote monitoring terminal device 200 is always fed with electric power from the battery BT.

Remote Monitoring Terminal Device

As illustrated in FIG. 3, the remote monitoring terminal device 200 includes a communications section 210, a power supply control section 220, a control section 240, and connection terminals T. The power supply control section 220 periodically starts up power supply while the startup switch SW of the agricultural machine 110 is being turned off. The control section 240, during communication, transmits/receives data and controls various inputs/outputs and computations. The remote monitoring terminal device 200 receives inputs of data on the operation state of the agricultural machine 110 via the connection terminals T.

Communications Section

The communications section 210 is capable of the same communications protocols as the communications section 131 in the remote monitoring device 130 at the remote monitoring center 120 so that the communications section 210 can communicate with the communications section 131. The communications section 210 converts the data to be transmitted/received during communication according to the communications protocols. The communications section 210 then transmits the data, acquired by the control section 240, on the operation state of the agricultural machine 110 to the remote monitoring device 130.

Power Supply Control Section

The power supply control section 220 has a timer function and is connected to the battery BT, no matter whether the startup switch SW is being turned off or on. Specifically, the battery BT is connected to an incoming power supply line (not shown) for the power supply control section 220 via the power supply connecting line Lbt, so that the power supply control section 220 can be always fed with. electric power from the battery BT.

An outgoing power supply line (not shown) for the power supply control section 220 is connected to a power supply line (not shown) for the control section 240 via a power supply connecting line L3.

In the remote monitoring terminal device 200, the control section 240 is periodically fed with electric power from the battery BT by virtue of the timer function of the power supply control section 220 while the startup switch SW is being turned off to inhibit electric power from being supplied to the power supply connecting line L1 which connects the battery BT to the incoming power supply tine for the control section 240. This arrangement is for the purpose of reducing the power consumption of the battery BT, Location Detection Section In the present embodiment, the remote monitoring terminal device 200 further includes a GPS (Global Positioning System) sensor (exemplary location sensor) 231, a location detection section 232, and a location information storage section 233. The GPS sensor 231 receives radio waves from GPS satellites. The location detection section 232 detects the location information of the agricultural machine 110 in the radio waves received by the GPS sensor 231. The location information storage section 233 temporarily stores therein the location information detected by the location detection section 232.

The GPS sensor 231 receives radio waves (information containing an international standard time) from GPS satellites. The international standard time here is the UTC, or Universal Time Coordinated.

The location detection section 232 is capable of detecting, besides the location information of the agricultural machine 110, the velocity and orientation information of the agricultural machine 110. In other words, the location information contains information on the latitude, longitude, velocity, and orientation of the agricultural machine 110.

Specifically, the location detection section 232, along with the GPS sensor 231 and GPS satellites, constitutes a GPS satellite system (positioning system).

The location information storage section 233 is a volatile memory such as a RAM (random access memory). The location information storage section 233 is connected to the power supply control section 220 so as to be always fed with electric power from the battery BT. Thus, the location information storage section 233 is capable of maintaining the location information even while the startup switch SW is being turned off.

Control Section

The control section 240 includes a processor section 250 and a storage section (exemplary data storage section) 260. The processor section 250 is composed of a CPU (central processing unit) or like microcomputer. The storage section 260 is composed primarily of a ROM (read only memory), RAM, and like volatile memory.

The control section 240 controls the operation of various components by the processor section 250 loading control programs stored in advance in the ROM in the storage section 260 to the RAM in the storage section 260 and executing them. The RAM in the storage section 260 provides first to fifth data storage sections 261 to 265.

Connection Terminals

Multiple (in this case, 70) connection terminals T serve as multiple types of connection terminals connected to output elements Q at which data on the operation state of the agricultural machine 110 is supplied externally. In the present embodiment are there provided at least one (in this case, 32) first connection terminal T1, at least one (in this case, 20) second connection terminal T2, at least one (in this case, 4) third connection terminal T3, at least one (in this case, 8) fourth connection terminal T4, at least one (in this case, 2) fifth connection terminal T5, and at least one (in this case, 2) sixth connection terminal T6.

The first, second, third, and fourth connection terminals T1, T2, T3, and T4 are connected to the control section 240. The first and second connection terminals T1 and T2 are connected to the output elements Q for the work sections 111 via the electronic control devices 113. The fifth and sixth connection terminals T5 and T6 are connected to the control section 240 and also directly to the output elements Q for the work sections 111.

The first connection terminals T1 are connected to output elements Qa at which binary information (specifically, binarized signals) is available, to receive the binary information at the output elements Qa. The binary information is, for example, on/off information (specifically, contact point information represented by a 0 or 1) and error status information (specifically, error presence/absence information represented by a 0 or 1) indicating the presence/absence of a breakdown/malfunction or like irregularity In this example, the binary information is transmitted in the form of CAN bit data.

The output elements Qa at which binary information is available may be composed of, for example, various switches Wa which are connected to input circuitry for the electronic control devices 113 for output of on/off information on the operation state of the agricultural machine 110. Another example would be an output control section Pa in an electronic control device 113 for output of error status information indicating the presence/absence of a breakdown/malfunction or like irregularity in the work sections 111.

Specifically, if the output elements Qa are composed of various switches Wa, the first connection terminals T1 receive on/off information from the various switches Wa via the electronic control devices 113; if the output elements Qa are provided as an output control section Pa, the first connection terminals T1 receive error status information from the output control section Pa in the electronic control devices 113.

The second connection terminals T2 are connected to output elements Qb at which detected value information (specifically, multivalue digital signals) is available, to receive the detected value information at the output elements Qb. The detected value information is, for example, numeric value data indicating measured (detected) values of a predetermined set of physical quantities, error codes indicating the type of the breakdown/malfunction or like irregularity, and the voltage level of the battery BT, in this example, the detected value information is transmitted in the form of CAN numeric value data.

The output elements Qb at which detected value information is available may be composed of, for example, various sensors Wb which are connected to input circuitry for the electronic control devices 113 for detection of the operation state of the agricultural machine 110. Another example would be an output control section Ph in an electronic control device 113 (engine controller 113*a*) for output of the voltage level of the battery BT.

Specifically, if the output elements Qb are composed of various sensors Wb, the second connection terminals T2 receive numeric value data from the various sensors Wb via the electronic control devices 113; if the output elements Qb are provided as an output control section Pb, the second connection terminals T2 receive the voltage level of the battery BT from the output control section Pb in the electronic control device 113 (engine controller 113*a*).

The third connection terminals T3 are connected to output elements Qc at which integrated information (e.g., an integrated time) is available, to receive the integrated, information at the output elements Qc. In this example, the integrated information is transmitted in the form of CAN integrated data.

The output elements Qc at which integrated information is available may be provided as, for example, an output control section Pc in an electronic control device 113 (engine controller 113*a*) for output of an integrated time obtained by integrating the operation times of the engine 112. An operation time is the time from a startup of the engine 112 (when the startup switch SW is turned on) to a subsequent shutdown of the engine 112 (when the startup switch SW is turned off).

Specifically, if the output elements Qc are provided as an output control section Pc, the third connection terminals T3 receive the integrated time of the engine 112 from the output control section Pc in the electronic control device 113 (engine controller 113*a*).

The fourth connection terminals T4 are connected to output elements Qd at which error information according to the CAN communications protocol is available, to receive error information at the output elements Qd.

The output elements Qd at which error information is available may be provided as, for example, an output control section Pd in an electronic control device 113 for identification of an error in view of the specifications of the CAN communications protocol and for output of error information in accordance with the error.

Specifically, if the output elements Qd are provided as an output control section Pd, the fourth connection terminals T4 receive error information from the output control section Pd in the electronic control device 113.

The fifth connection terminals T5 are connected to output elements Qe at which binary information is available, to receive the binary information at the output elements Qe.

The output elements Qe at which binary information is available may be composed of, for example, various switches We provided for output of on/off information on the operation state of the agricultural machine 110.

Specifically, if the output elements Qe are composed of various switches We, the fifth connection terminals T5 receive the on/off information directly from the various switches We. The fifth connection terminals T5 may be used when the work sections 111 include an electronic control device 113. However, the terminals T5 will be advantageously used primarily when the work sections 111 do not include an electronic control device 113.

The sixth connection terminals T6 are connected to output elements Qf at which detected value information (specifically, analog signals) is available, to receive the detected value information, at the output elements Qf. The detected value information is, for example, numeric value data indicating measured (detected) values of a predetermined set of physical quantities (e.g., the voltage level of the battery BT and the temperature of a board (not shown) mounted in an electronic control device 113).

The output elements Qf at which detected value information is available may be composed of, for example, various sensors Wf for detection of the operation states of the agricultural machines 110.

Specifically, if the output elements Qf are composed of various sensors Wf, the sixth connection terminals T6 receive numeric value data directly from the various sensors Wf.

The startup information transmission control section 241 and the operation information transmission control section 242, both shown in FIG. 3, will be detailed later.

FIG. 4 is a table showing concrete examples of output elements Qa to Qf for various connection terminals T1 to T6 in a case where the agricultural machine 110 is a combine harvester.

As listed in FIG. 4, the output elements a connected to the first connection terminals T1 are fed, from the first connection terminals T1, with 32 items of binary information, including warnings on a thresh switch, a harvest, switch, an engine-related charge, a hydraulic pressure, water temperature, an overload, a clogged air cleaner, a clogged rice straw discharger/cutter, and an emergency engine shutdown. The output elements Qb connected to the second connection terminals T2 are fed, from the second connection terminals T2, with 20 items of detected value information, including the rotational speed of the engine 112 in and out of operation, the engine load ratio of the engine 112 approximately indicating a load on the engine 112 in and out of operation, the vehicle speed in and out of operation, and the rotational speed of the swing motor in and out of operation. The output elements Qc connected to the third connection terminals T3 are fed with 4 items of integrated information (in this example, one item of integrated information) from the third connection terminals T3, The output elements Qd connected to the fourth connection terminals T4 are fed with 4 items of error information from the fourth connection terminals T4. The output elements Qe connected to the fifth connection terminals T5 are fed with 8 items of binary information from the fifth connection terminals T5. The output elements Qf connected to the sixth connection terminals T6 are fed with 2 items of detected value information (specifically, battery voltage and board temperature) from the sixth connection terminals T6.

The control section 240 includes a startup information transmission control section 241 and an operation information transmission control section 242. The startup information transmission control section 241 provides a startup information transmitting function for the transmission of startup information under particular conditions. The operation information transmission control section 242 provides an operation information transmitting function for the transmission of operation information under particular conditions.

Next, the startup information transmitting function and the operation information transmitting function will be described one after the other.

Startup Information Transmitting Function

FIG. 5 is a schematic operation diagram of an operation process for the startup information transmitting function implemented by the startup information transmission control section 241 in the control section 240.

The control section 240 includes the startup information transmission control section 241 which transmits startup information to the remote monitoring device 130 when the startup switch SW of the agricultural machine 110 is manually turned on (denoted by α1 in FIG. 5). The startup information contains the location information (specifically, longitude and latitude) of the agricultural machine 110 and a date and time (specifically, year, month, day, hour, minute, and second according to the global standard Gregorian calendar) obtained upon a startup. The location information may contain the velocity and orientation of the agricultural machine 110.

Specifically, the startup information transmission control section 241 operates as a work section containing a manual turn-on operation receiving section 241*a*, a data acquisition section 241*b*, a data storage control section 241*c*, and a data transmission section 241*d*. The manual turn-on operation receiving section 241*a* receives a manual turn-on operation of the startup switch SW of the agricultural machine 110. The data acquisition section 241*b* detects and acquires the location information of the agricultural machine 110 and a date and time by means of the GPS sensor 231 and the location detection section 232 when the manual turn-on operation receiving section 241*a* has received a manual turn-on operation of the startup switch SW of the agricultural machine 110. The data storage control section 241*c* temporarily stores in the location information storage section 233 the location information and date and time acquired by the data acquisition section 241b. The data transmission section 241d transmits the location information and date and time stored in the location information storage section 233 to the remote monitoring device 130 via the communications section 210.

FIG. 6 is a schematic illustration of data structure in the location information storage section 233 for use by the startup information transmission control section 241.

As illustrated in FIG. 6, the location information storage section 233 stores therein a date and time (specifically, year, month, day, hour, minute, and second according to the global standard Gregorian calendar) and location information (latitude and longitude) when the startup switch SW of the agricultural machine 110 has been manually turned on (upon a startup). The location information storage section 233 further stores therein a date and time (specifically, year, month, day, hour, minute, and second according to the global standard Gregorian calendar) and location information (latitude and longitude) when the startup switch SW of the agricultural machine 110 has been manually turned off (upon a shutdown).

The time t from a manual turn-on operation of the startup switch SW to an acquisition of the location information of the agricultural machine 110 and a date and time in a detecting operation of the GPS sensor 231 (see FIG. 5) may be, for example, approximately 40 seconds to 180 seconds.

If no startup information is acquired within a predetermined period (e.g., 300 seconds (5 minutes)) after a manual turn-on operation of the startup switch SW, the data transmission section 241d transmits, to the remote monitoring device 130, manual turn-on operation information indicating that the startup switch SW has been manually turned on, in place of startup information, under the control of the startup information transmission control section 241.

The remote monitoring terminal device 200 converts, in the communications section 210, various information into a format that is in accordance with the communications protocols for the communications section 131 in the remote monitoring device 130. Thereafter, the remote monitoring terminal device 200 transmits the converted information to the remote monitoring device 130 over the communications network 140 and via the communications section 131. This enables the remote monitoring center to check the startup information (specifically latitude and longitude and year, month, day, hour, minute, and second according to the global standard Gregorian calendar) of the agricultural machine 110. A similar arrangement applies to operation information for the operation information transmitting function (detailed later).

Exemplary Operation of Startup information Transmission Control Section

Next will be described an exemplary operation of the startup information transmission control section 241 in reference to FIG. 7 which is a flow chart depicting an exemplary operation of the startup information transmission control section 241.

Figure 7:
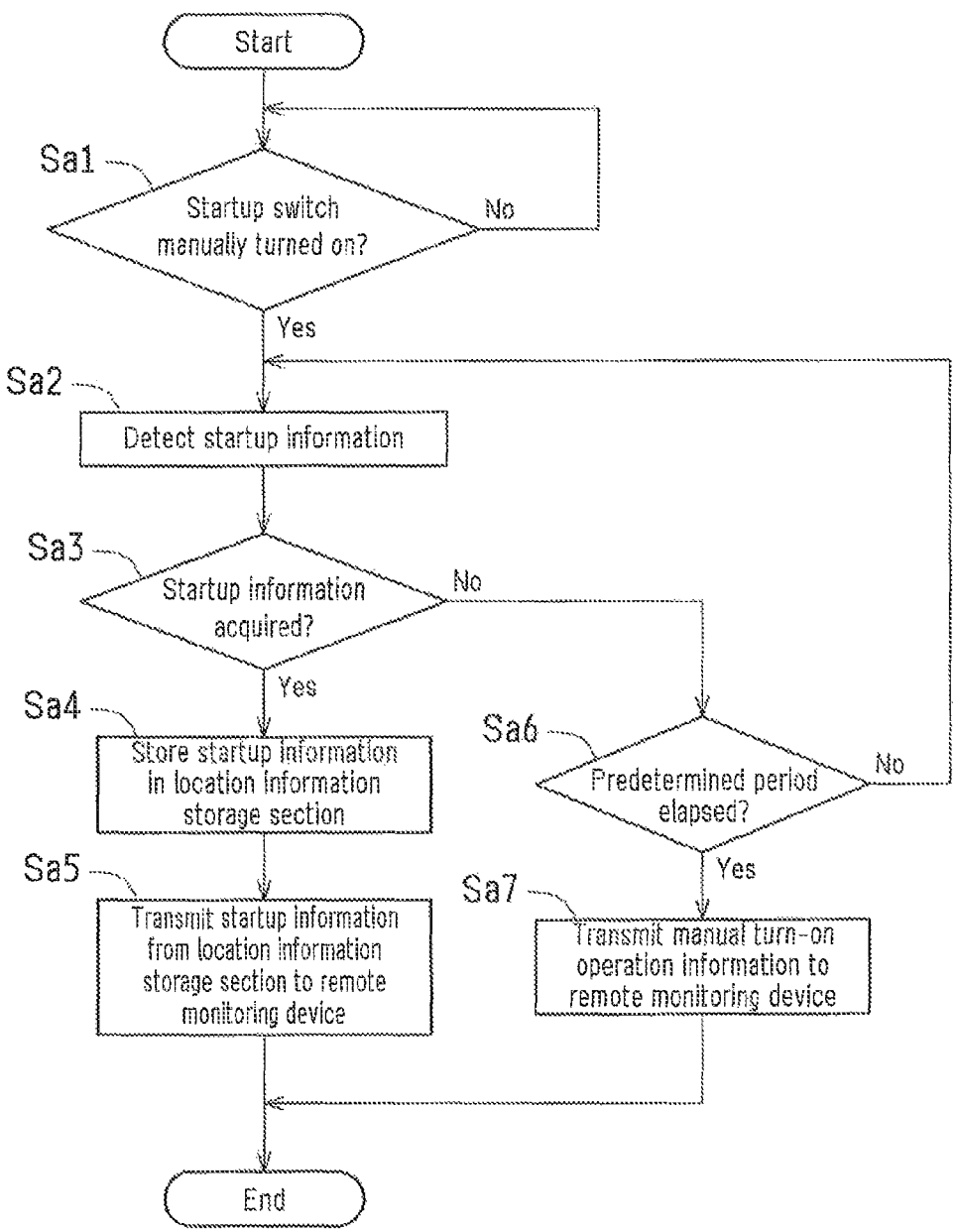
FIG. 7 is a flow chart depicting an exemplary operation of a startup information, transmission control section.

According to the flow chart shown in FIG. 7, upon the startup switch SW being manually turned on (Yes in step Sa1), the GPS sensor 231 and the location detection section 232 detect the startup information of the agricultural machine 110 (in this example, location information and a date and time) (step Sa2).

Next, it is determined whether the startup information of the agricultural machine 110 has been acquired (step Sa3). If the startup information has been acquired (Yes in step Sa3), the acquired startup information is stored in the location information storage section 233 (step Sa4), and the startup information stored in the location information storage section 233 is transmitted to the remote monitoring device 130 (step Sa5), which ends the process. On the other hand, if it is determined in step Sa3 that the startup information of the agricultural machine 110 has not been acquired (No in step Sa3), it is determined whether a predetermined period in this example, 300 seconds) has elapsed (step Sa6). If the predetermined period has not elapsed (No in step Sa6), the process proceeds to step Sa2. On the other hand, if it is determined in step Sa6 that the predetermined period has elapsed (Yes in step Sa6), manual turn-on operation information indicating that the startup switch SW has been manually turned on is transmitted to the remote monitoring device 130 (step Sa7), which ends the process.

Operation Information Transmitting Function

Figure 8:
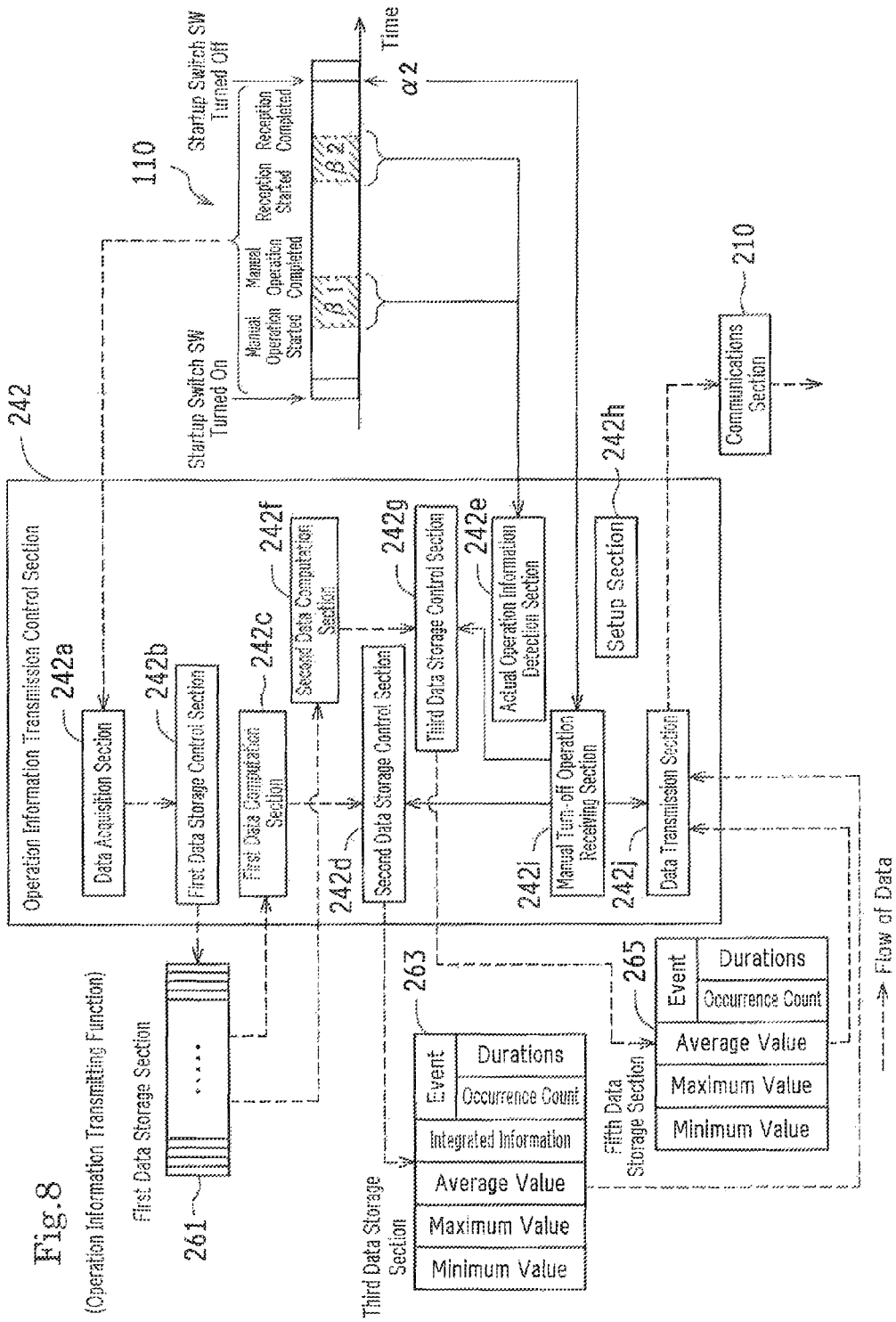
FIG. 8 is a schematic operation diagram of an operation process for an operation information transmitting function implemented by an operation information transmission control section in a control section.

FIG. 8 is a schematic operation diagram of an operation process for the operation information transmitting function implemented by the operation information transmission control section 242 in the control section 240. The GPS sensor 231, the location detection section 232, and the location information storage section 233 are omitted in FIG. 8.

The control section 240 includes the operation information transmission control section (exemplary data abridging control section) 242 for transmitting operation information to the remote monitoring device 130 when the startup switch SW of the agricultural machine 110 is manually turned off (denoted by α2 in FIG. 8).

Specifically, the operation information transmission control section 242 operates as a work section containing a data acquisition section 242a, a first data storage control section 242b, a first data computation section 242c, and a second data storage control section 242d. The data acquisition section 242a acquires, at predetermined intervals (e.g., every 0.1 seconds), data (see FIGS. 4 and 6) on the operation state of the agricultural machine 110 fed via the connection terminals T. The first data storage control section 242b temporarily stores in the first data storage section (specifically, ring buffer) 261 a predetermined number of latest data sets (points in time) (e.g., 600 sets (points in time)) in the cyclic data acquired by the data acquisition section 242a. The first data computation section 242c computes minimum, maximum, and average values of part of the data on the operation state collected over a period from a manual turn-on of the startup switch SW to the latest data acquisition and also an occurrence count and durations of a predetermined event during that period, all on the basis of the cyclic data stored in the first data storage control section 242b. The second data storage control section 242d temporarily stores in the third data storage section 263 the minimum and maximum values in the data on the operation state of the agricultural machine 110 and the occurrence count and durations of to predetermined event, all computed by the first data computation section 242c.

The operation information transmission control section 242 further operates as a work section containing an actual operation information detection section 242e, a second data computation section 242f, and a third data storage control section 242g. The actual operation information detection section 242e detects actual operation information on an actual operation. The second data computation section 242f computes, from the cyclic data stored in the first data storage control section 242h, minimum, maximum, and average values of actual operation data and an occurrence count and durations of a predetermined event. The actual operation data and the occurrence count and durations of a predetermined event are part of data on the operation state collected over a period from a manual turn-on of the startup switch SW to the latest data acquisition, the part being collected when the actual operation information detection section 242e has detected actual operation information. The third data storage control section 242g temporarily stores in the fifth data storage section 265 the minimum and maximum values in the actual operation data on the operation state of the agricultural machine 110 and the occurrence count and durations of a predetermined event, all computed by the second data computation section 242f.

In the operation information transmission control section 242, the data acquisition section 242a, the first data storage control section 242b, the first data computation section 242c, and the second data storage control section 242d constitute a first storage control arrangement, whereas the data acquisition section 242a, the first data storage control section 242b, the actual operation information detection section 242e, the second data computation section 242f, and the third data storage control section 242g constitute the second storage control arrangement. The second data computation section 242f may, in place of, or in addition to, the configuration above, compute minimum, maximum, and average values of the data and an occurrence count and durations of a predetermined event when the actual operation information detection section 242e has detected non-actual operation information (e.g., idling state).

For example, the actual operation information detection section 242e detects whether a manual operation related to an actual operation of a predetermined manual operation section has been done or whether an actual operation signal related to an actual operation has been received from various predetermined sensors. Specifically, the actual operation information detection section 242e transmits manual operation signals to the second data computation section 242f from a start of a manual operation of a predetermined manual operation section (specifically, an actual operation turn-on) to an end of the manual operation (specifically, an actual operation turn-off) (denoted by β1 in FIG. 8). The actual operation information detection section 242e also transmits to the second data computation section 242f sensor signals from various sensors from a start of reception (specifically, an actual operation turn-on) to an end of reception (specifically, an actual operation turn-off) (denoted by β2 in FIG. 8). The operation information transmission control section 242 is capable of distinguishing between an actual operation and a non-actual operation based on the manual operation signals and sensor signals from the actual operation information detection section 242e. The manual operation signals and sensor signals from the actual operation information detection section 242e may be signals indicating an actual operation state(s) of the predetermined manual operation section or various sensors (specifically, signals indicating an actual operation turn-on) or may be signals indicating an idling state(s) of the predetermined manual operation section or various sensors (specifically signal indicating an actual operation turn-off).

In the second storage control arrangement, which predetermined manual operation section or various sensors is/are to be involved in actual operation is determined in advance according to the type of data on the operation state. For example, if the data type is engine rotation, engine load ratio, or vehicle speed which are given as examples in FIG. 12 (detailed later), the gear shift lever is designated as the predetermined manual operation section which detects whether there has been a manual operation in the actual operation information detection section 242e.

The second data storage control section 242d temporarily stores integrated information and error information in the third data storage section 263. In the present embodiment, the first data storage section 261 is used as a ring buffer in which data is stored in storage areas arranged in series, both ends of the buffer being logically linked so that the buffer can be handled like a ring.

The operation information contains the location information (specifically, longitude and latitude) and the date and time (specifically, year, month, day, hour, minute, and second according to the global standard Gregorian calendar) (see FIG. 6) when the startup switch SW of the agricultural machine 110 is manually turned on; the location information (specifically, longitude and latitude) and the date and time (specifically, year, month, day, hour, minute, and second according to the global standard Gregorian calendar) (see FIG. 6) when the startup switch SW of the agricultural machine 110 is manually turned off, the turn-on counts of the various switches Wa and We (i.e., the numbers of times that the various switches Wa and We are manually turned on) over a period from a manual turn-on to a subsequent manual turn-off of the startup switch SW of the agricultural machine 110; the turn-on durations of the various switches Wa and We (i.e., the durations in which the various switches Wa and We are turned on) during that period; the minimum, maximum, and average values of the detected values fed via the various sensors Wb and Wf; the integrated information obtained upon startups and shutdowns fed via the various sensors Wb and Wf; the occurrence count and durations of a predetermined event; and error information (specifically, error codes) for a predetermined, sequential occurrence count. The error information (specifically, error codes) other than for the predetermined occurrence count (e.g., is not transmitted (not stored).

The predetermined interval is by no means limited in any particular manner and may be, for example, any first interval (specifically, 0.1 seconds) longer than 0 seconds and shorter than 1 second or any second interval (specifically, 1 second) longer than or equal to 1 second and shorter than 60 seconds. In this example, the predetermined interval is 0.1 seconds. The operation information transmission control section 242 may selectively switch between the first interval (specifically, 0.1 seconds) and the second interval (specifically, 1 second). When this is the case, the switching between the first and second intervals may be done either in the remote monitoring terminal device 200 or in the remote monitoring device 130.

The first storage control arrangement should be activated alone, the second storage control arrangement should be activated alone, or both the first and second storage control arrangements should be activated together, depending on the type of data (e.g., engine rotation, engine load ratio, vehicle speed) on the operation state. In such cases, if the data collected when both the first and second storage control arrangements are being activated together was invariably transmitted to the remote monitoring device, efficiency in operation and transmission would be less than desirable.

Accordingly, In the present embodiment, the operation information transmission control section 242 operates as a work section further containing a setup section 242h which specifies, for each type of data on the operation state, an operation selection as to whether the first storage control arrangement should be activated alone (of the first and second storage control arrangements), the second storage control arrangement should be activated alone, or both the first and second storage control arrangements should be activated.

The operation information transmission control section 242 enables activation of at least either one of the first and second storage control arrangements in accordance with the operation selection specified by the setup section 242h. Specifically, if the operation selection specified by the setup section 242h is such that both the first and second storage control arrangements should be activated, the operation information transmission control section 242 enables activation of both control arrangements (the first and second storage control arrangements) for a corresponding type of data. If the operation selection specified by the setup section 242h is such that the first storage control arrangement should be activated alone, the operation information transmission control section 242 enables activation of the first storage control arrangement for a corresponding type of data. If the operation selection specified by the setup section 242h is such that the second storage control arrangement should be activated alone, the operation information transmission control section 242 enables activation of the second storage control arrangement for a corresponding type of data.

Settings for an operation selection for at least either one of the control arrangements (first and second storage control arrangements) may be changed in the remote monitoring terminal device 200 or in the remote monitoring device 130. Value settings for the first and second intervals and items of the binary information, detected value information, and error information may be changeable. When this is the case, the value settings for the first and second intervals and items of the binary information, detected value information, and error information may be changed in the remote monitoring terminal device 200 or in the remote monitoring device 130. In addition, the remote monitoring terminal device 200 may be capable of accepting or rejecting an instruction from the remote monitoring device 130 for a change in the settings for operation selection for the control arrangements and for a change in the value settings for the first and second intervals and the items of the binary information, detected value information, and error information.

An occurrence of a predetermined event is an occurrence of a predetermined manual operation or action or of a change in state which can happen accidentally or indeliberately in the agricultural machine 110. A predetermined event can happen, for example, when an error has occurred which indicates an irregularity (specifically, irregular charge (power generation), irregular hydraulic pressure, irregular water temperature, etc.) during a predetermined procedure, when a predetermined manual operation section (specifically, a manual traveling operation section, a manual harvesting operation section, a manual threshing operation section, etc.) has received, a manual turn-on or turn-off operation of a switch (e.g., a travel switch, a harvest switch, a thresh switch, etc.) for a predetermined procedure, or when the detected value detected by a sensor goes beyond a predetermined threshold.

The first and second storage control arrangements of the operation information transmission control section 242 are capable of determining maximum, minimum, and average values of detected value information and an occurrence count and durations of an event, for example, as detailed in the following.

The manual turn-off operation receiving section 242i and the data transmission section 242j shown in FIG. 8 will be detailed later.

Figure 9:
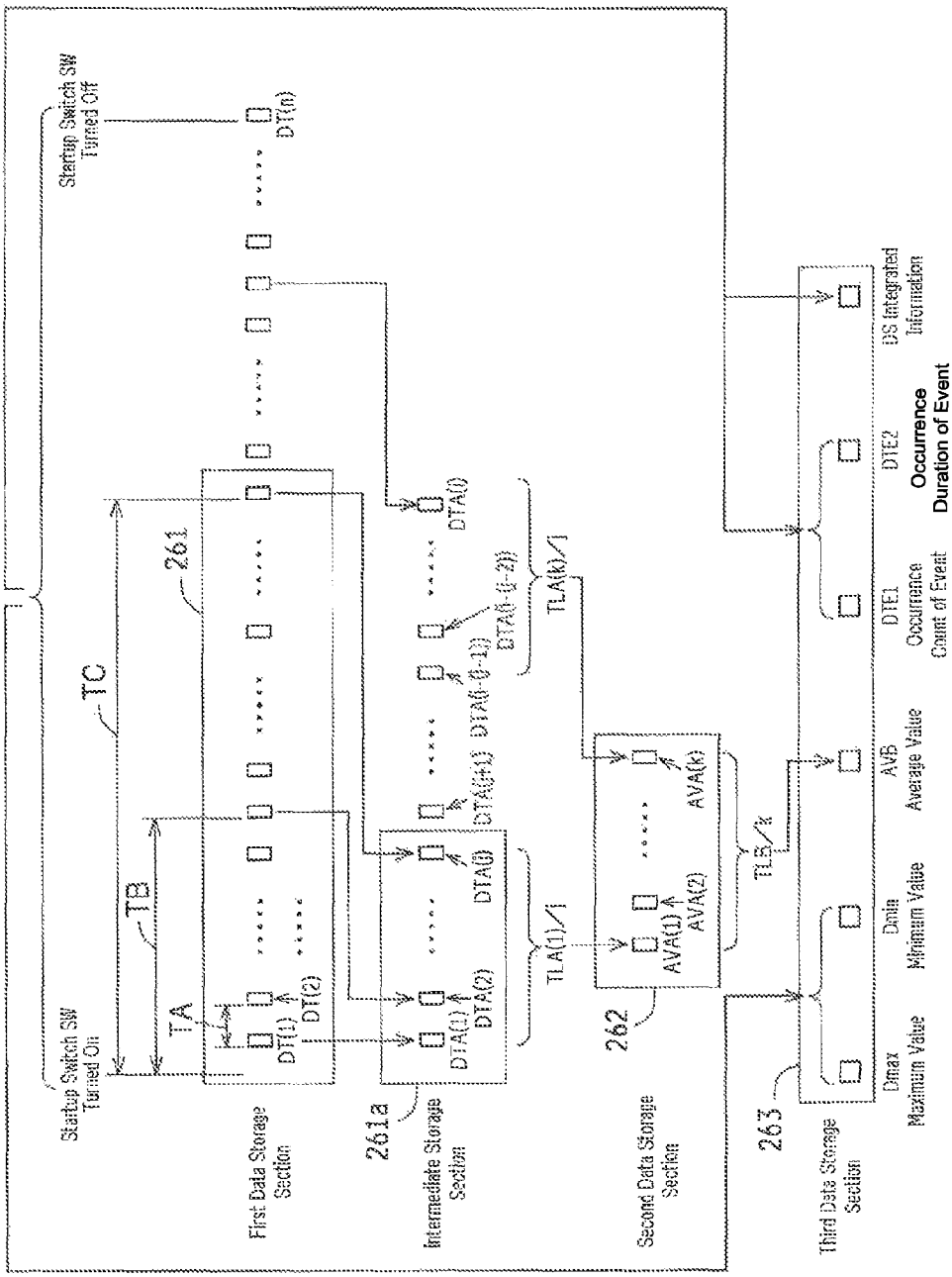
FIG. 9 is a diagram illustrating an exemplary operation for a first storage control arrangement of an operation information transmission control section to determine maximum, minimum, and average values of detected value information and an occurrence count and durations of an event.
Figure 10:
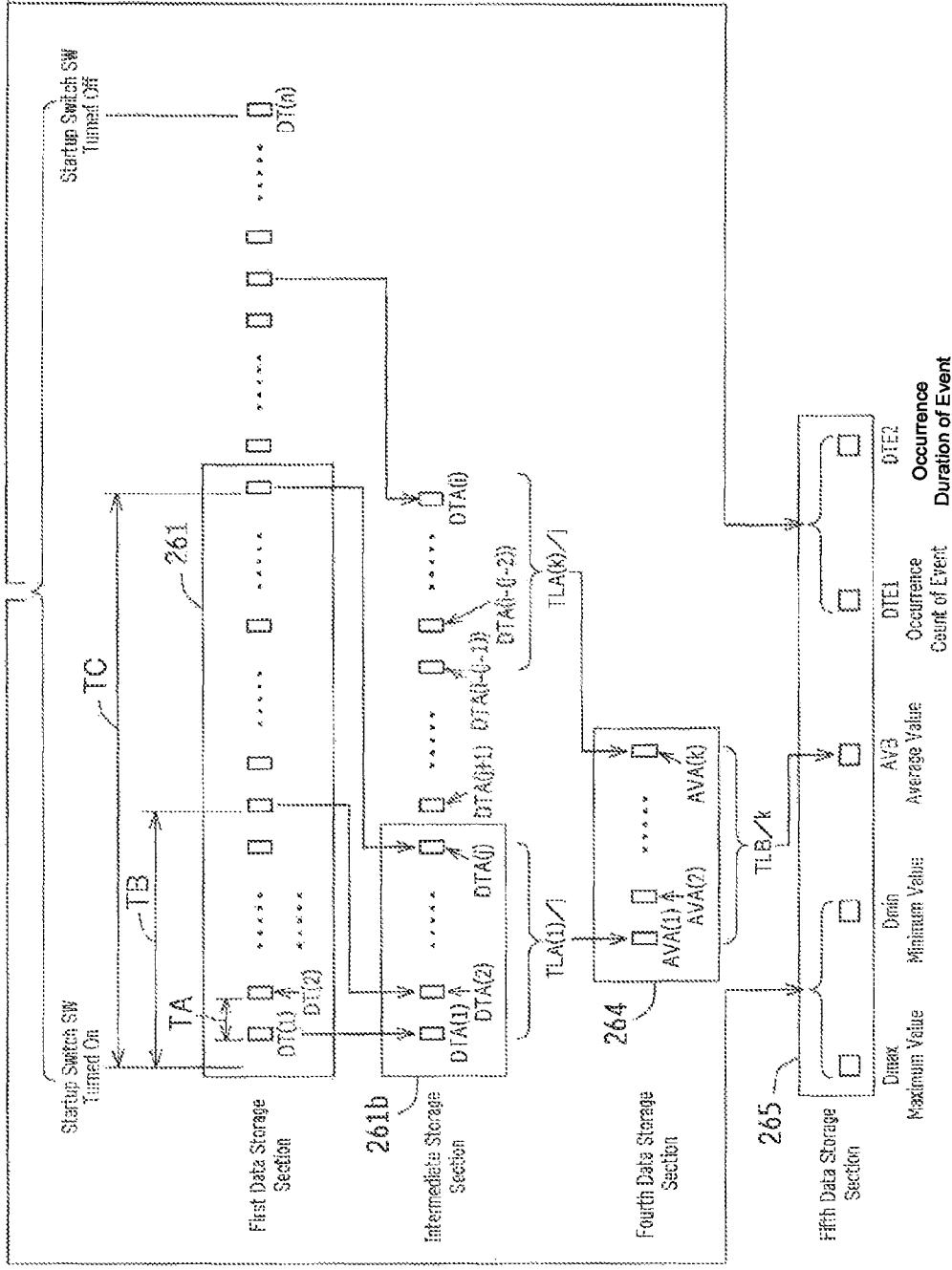
FIG. 10 is a diagram illustrating an exemplary operation for a second storage control arrangement of the operation information transmission control section to determine maximum, minimum, and average values of detected value information and an occurrence count and durations of an event.

FIG. 9 is a diagram illustrating an exemplary operation for the first storage control arrangement of the operation information transmission control section 242 to determine maximum, minimum, and average values of detected value information and an occurrence count and durations of an event. FIG. 10 is a diagram illustrating an exemplary operation for the second storage control arrangement of the operation information transmission control section 242 to determine maximum, minimum, and average values of detected value information and an occurrence count and durations of an event.

In the exemplary operation of the operation information transmission control section 242 shown in FIGS. 9 and 10, under the control of the first data storage control section 242b, the data acquisition section 242a temporarily stores data sets DT(1) to DT(n) (n is an integer greater than or equal to 2) in the first data storage section 261 at predetermined intervals TA (e.g., every 0.1 seconds) starting when the startup switch SW of the agricultural machine 110 is manually turned on. Accordingly, the first data storage section 261, under the control of the first data storage control section 242b, stores therein the cyclic binary information (specifically, contact point information and error presence/absence information) detected at the output elements (Qa, Qe, etc.) and the cyclic detected value information (specifically, rotational speed and engine load ratio of the engine 112, vehicle speed, error codes, board temperature, battery voltage, etc) detected at the output elements (Qb, Qf, etc.). The first data storage section 281 further stores therein the cyclic integrated information (integrated time) detected at the output elements (Qc, etc.) and the cyclic error information detected at the output elements (Qd, etc.) under the control of the first data storage control section 242b.

To determine a maximum value in the detected value information (specifically, rotational speed and engine load ratio of the engine 112, vehicle speed, etc.), the first and second data computation sections 242c and 242f store the detected value information detected at the output elements (Qb, Qf, etc.) in the third and fifth data storage sections 263 and 265 under the control of the second and third data storage control sections 242d and 242g and compare the detected value information subsequently detected at the output elements (Qb, Qf, etc.) with the detected value information stored in the third and fifth data storage sections 263 and 265. If the detected value information detected at the output elements (Qb, Qf, etc.) is greater than the detected value information stored in the third and fifth data storage sections 263 and 265, the first and second data computation sections 242c and 242f replace the detected value information stored in the third and fifth data storage sections 263 and 265 with the detected value information detected at the output elements (Qb, Qf, etc.) to update a maximum value Dmax.

To determine a minimum value in the detected value information, the first and second data computation sections 242c and 242f store the detected value information detected at the output elements (Qb, Qf, etc.) in the third and fifth data storage sections 263 and 265 under the control of the second and third data storage control sections 242d and 242g and compare the detected value information subsequently detected at the output elements (Qb, Qf, etc.) with the detected value information stored in the third and fifth data storage sections 263 and 265. If the detected value information detected at the output elements (Qb, Qf, etc.) is smaller than the detected value information stored in the third and fifth data storage sections 263 and 265, the first and second data computation sections 242c and 242f replace the detected value information stored in the third and fifth data storage sections 263 and 265 with the detected value information detected at the output elements (Qb, Qf, etc.) to update a minimum value Dmin.

To calculate an average value of the detected value information, the first and second data computation sections 242c and 242f temporarily store a predetermined, number, j, (e.g., j=60) of latest sampling data sets DTA(1) (=DT(1)), DTA(2) (=DT(11)), DTA(3) (=DT(21)), . . . , and DTA(i) (=DT(n·9)) (i=n/m) in intermediate storage sections (specifically, ring buffers) 261a and 261b under the control of the second and third data storage control sections 242d and 242g. The sampling data DTA(1) to DTA(i) is a subset of all the latest data sets DT(1) to DT(n) (n is an integer greater than or equal to 2)

stored in the first data storage section 261 and made up of those cyclic data sets with an averaging interval TB which is a multiple of the predetermined interval TA. The multiplication factor, m, is an integer greater than or equal to 2 (e.g., m=10, TA=0.1 seconds, TB=TA×m=0.1 seconds×10=1 second).

Next, the first and second data computation sections 242c and 242f calculate sums TLA(1) (=DTA(1)+. . . + DTA(j)), . . . , and TLA(k) (=DTA(i·(j−1))+. . . +DTA(i) (k=i/j), each being a sum of a further subset of the subset (sampling data) DTA(1) to DTA(i) obtained by sampling the subset DTA(1) to DTA(i) at sampling intervals TC. The sampling interval TC is equal to the averaging interval TB times j, where j is an integer multiplication factor greater than or equal to 2 (e.g., j=60, TC=TB×j=1 second×60=1 minute). The first and second data computation sections 242c and 242f then divide the sums b the integer multiplication factor j (e.g., j=60) to obtain values TLA(1)/j, . . . , and TLA(k)/j as 1-minute average values AVA(1), . . . , and AVA(k). The first and second data computation sections 242c and 242f temporarily store the obtained 1-minute average values AVA(1), . . . , and AVA(k) in the second and fourth data storage sections 262 and 264 at the sampling intervals TC under the control of the second and third data storage control sections 242d and 242g.

When the startup switch SW is manually turned off, the first and second data computation sections 242c and 242f calculate a total sum TLB of the 1-minute average values AVA(1), . . . , and AVA(k) stored in the second and fourth data storage sections 262 and 264 and divide the total sum TLB by the number, k, of the 1-minute average values AVA(1), . . . , and AVA(k) to obtain a value TLB/k as an average value AVB. The obtained average value AVB is stored in the third and fifth data storage sections 263 and 265 under the control of the second and third data storage control sections 242d and 242g.

To calculate an occurrence count and durations of an event, the first and second data computation sections 242c and 242f store a turn-on count (number of OFF-to-ON changes) DTE1 and a turn-on duration DTE2 available in the contact point information at the output elements (Qa, Qe, etc.) and a turn-on count DTE1 and a turn-on duration DTE2 available in the error presence/absence information at the output elements (Qa, Qe, etc.) in the third and fifth data storage sections 263 and 265 under the control of the second and third data storage control sections 242d and 242g. The first and second data computation sections 242c and 242f then add a turn-on count and a turn-on duration available next in the contact point information and the error presence/absence information at the output elements (Qa, Qe, etc.) to the turn-on count DTE1 and the turn-on duration DTE2 stored in the third and fifth data storage sections 263 and 265 for update.

The second data storage control section 242d stores an integrated time DS available at the output element Qc in the third data storage section 263 upon startups and shutdowns. The second data storage control section 242d also stores error information available at the output element Qd in the third data storage section 263 sequentially for a predetermined occurrence count starting from the first occurrence.

FIG. 11 is a schematic data structure table showing exemplary data for the third data storage section 263 for use by the first storage control arrangement of the operation information transmission control section 242. FIG. 12 is a schematic data structure table showing exemplary data for the fifth data storage section 265 for use by the second storage control arrangement of the operation information transmission control section 242.

As listed in FIG. 11, under the control of the second data storage control section 242d, the third data storage section 263 stores therein, as data on the operation state containing the idling state obtained over a period from a manual turn-on to a manual turn-off of the startup switch SW is manually turned off, the turn-on count and turn-on duration in the form of binary information (specifically, contact point information and error presence/absence information) and the maximum, minimum, and average values, as well as the integrated information, of the detected value information (specifically, rotational speed and engine load ratio of the engine 112, vehicle speed, etc.).

As listed in FIG. 12, under the control of the third data storage control section 242g, the fifth data storage section 265 stores therein, as actual operation data on the actual operation state over a period from a manual turn-on to a manual turn-off of the startup switch SW is manually turned off, the turn-on count and turn-on duration in the form of binary information (specifically, contact point information and error presence/absence information) and the maximum, minimum, and average values, as well as the integrated information, of the detected value information (specifically, rotational speed and engine load ratio of the engine 112, vehicle speed, etc.). In FIG. 12, the working engine rotation refers to the rotational speed of the engine 112 in actual operation. The working engine load ratio refers to an engine load ratio in actual operation. The working vehicle speed refers to a vehicle speed in actual operation.

The operation information transmission control section 242 (see FIG. 8) further operates as a work section containing a manual turn-off operation receiving section 242i and a data transmission section 242j. The manual turn-off operation receiving section 242i receives a manual turn-off operation of the startup switch SW of the agricultural machine 110. The data transmission section 242j transmits, to the remote monitoring device 130 via the communications section 210, the maximum, minimum, and average values, the occurrence count and durations of an event, and the integrated information, all stored in the third data storage section 263, when the manual turn-off operation receiving section 242i has received a manual turn-off operation of the startup switch SW. The data transmission section 242j further transmits, to the remote monitoring device 130 via the communications section 210, the location information and date and time stored in the location information storage section 233 when the manual turn-off operation receiving section 242i has received a manual turn-off operation of the startup switch SW.

FIG. 13 is an illustration of an exemplary operation-selecting setup screen γ on a setup section 242h.

The operation-selecting setup screen γ in FIG. 13 shows engine rotation, engine load ratio, and vehicle speed, as examples of types of data on the operation state, The operation selection of "Operation/Idling" means an operation selection for the first storage control arrangement, the operation selection of "Actual Operation" means an operation selection for the second storage control arrangement.

In the exemplary operation-selecting setup screen γ, both "Operation/Idling" and "Actual Operation" are being selected (specifically, checkboxes are ticked) for engine rotation; "Actual Operation" alone is being selected for engine load ratio; and "Operation/Idling" alone is being selected for vehicle speed. A manual operation of the "OK" button γ1 on the operation-selecting setup screen γ establishes the operation selection, whereas a manual operation of the "Go back" button γ2 on the operation-selecting setup screen returns to the previous screen.

The setup section 242h stores the operation selection specified on the setup screen γ as a flag in the storage section 260. For example, for each type of data on the operation state, if "Actual Operation" alone is selected, "1" is stored in the storage section 260; if "Operation/Idling" alone is selected, "2" is stored in the storage section 260; and if both "Actual Operation" and "Operation/Idling" are selected, "3" is stored in the storage section 260. The operation information transmission control section 242 performs the process(es) of the first data computation section, the second data computation section, or both the first data computation section and the second data computation section for each type of data on the operation state in accordance with the flag stored in the storage section 260.

The setup section 242h allows to specify at least one operation selection from the first and second storage control arrangements for each of p types of data on the operation state (p is an integer greater than or equal to 2). For example, minimum and maximum values in both the first and second storage control arrangements for each of p types of data (2×p types of data) and an occurrence count and durations of a predetermined event can be obtained by making a maximum operation selection, in other words, by making an operation selection for both the first and second storage control arrangements for each of p types of data. This is, however, by no means limiting the invention. The number of selectable operations may be restricted to improve the transmission efficiency of transmission to the remote monitoring device 130. When this is the case, for example, assuming that p=6, there are a maximum of 12 types of data if an operation selection is made for both the first and second storage control arrangements for each of 6 types of data. It follows that with the number of selectable operations being restricted to 10, an operation selection can be made for both the first and second storage control arrangements for each of a maximum 4 types of data out of the 6 types of data, whereas an operation selection can be made for any one of the control arrangements (first and second storage control arrangements) for the remaining 2 types of data.

When the startup switch SW is manually turned off, power supply to the control section 240 is not turned off by the power supply control section 220. The power supply is turned off by the power supply control section 220 after the data transmission section 242j has transmitted the maximum, minimum, and average values, the occurrence count and durations of an event, and the integrated information, as well as the location information and date and time.

The third data storage section 263 stores therein operation information for a predetermined number of previous manual turn-on/off operations (e.g., for 30 manual turn-on/off operations). A pair of manual turn-on and turn-off operations of the startup switch SW is counted as a single manual turn-on/off operation.

Exemplary Operation of Operation information Transmission Control Section

Next will be described an exemplary operation of the first and second storage control arrangements of the operation information transmission control section 242 in reference to FIGS. 14 to 17.

Figure 14:
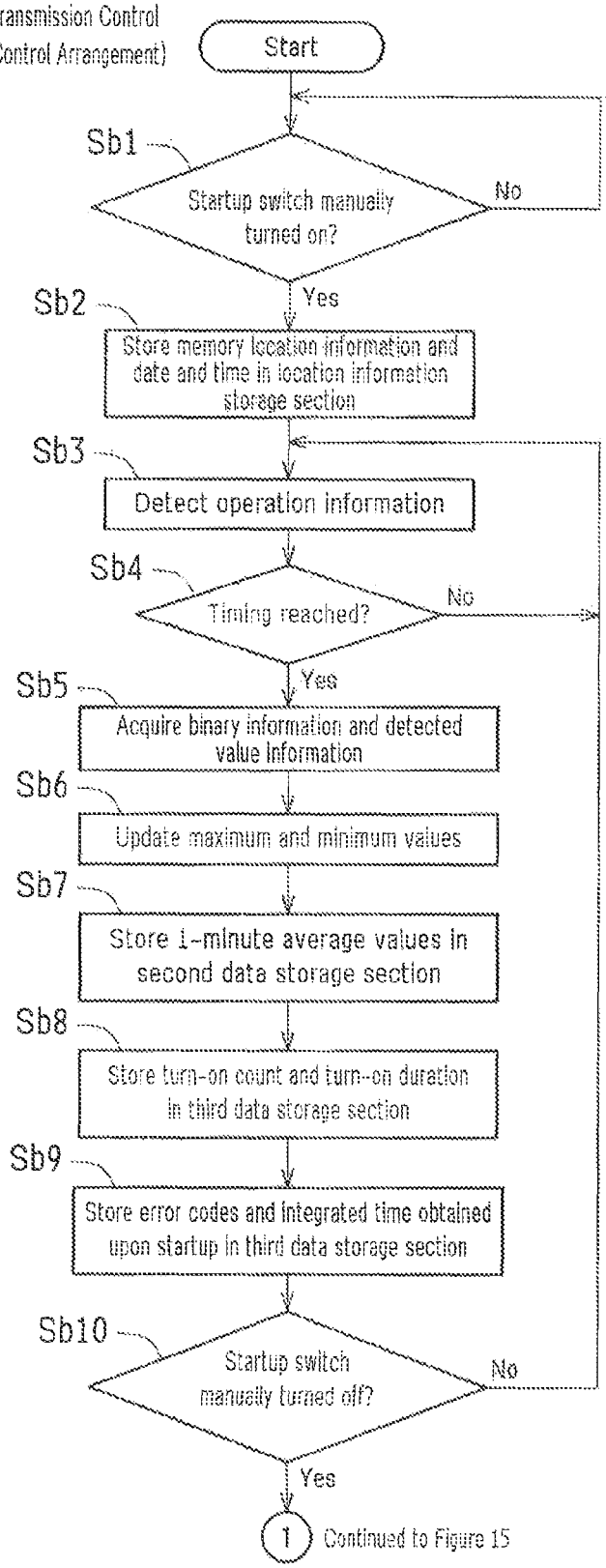
FIG. 14 is a flow chart depicting a first half of an exemplary operation of the first storage control arrangement of the operation information transmission control section.
Figure 15:
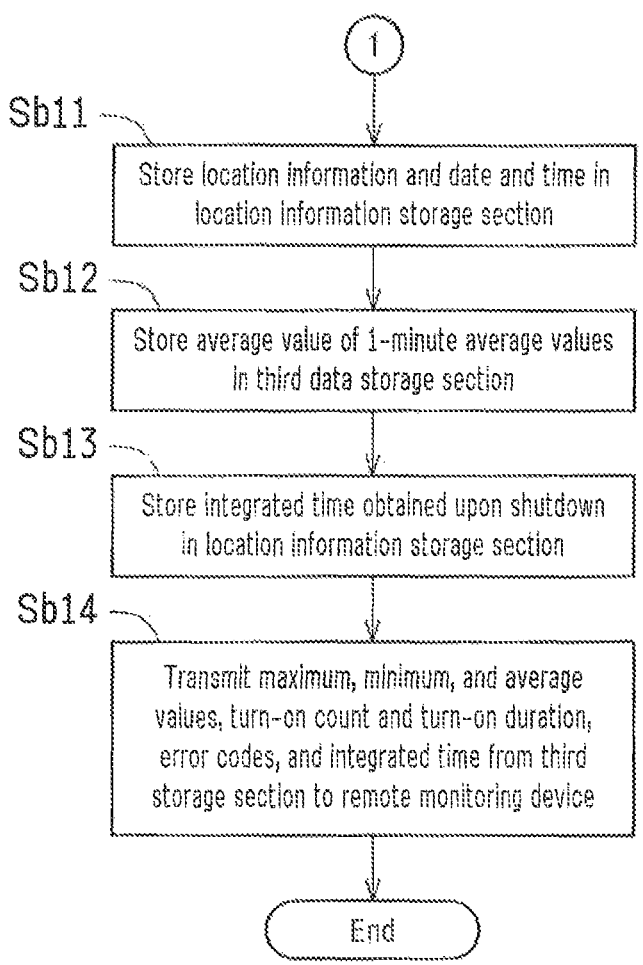
FIG. 15 is a flow chart depicting a second half of the exemplary operation of the first storage control arrangement of the operation information transmission control section.

FIGS. 14 and 15 are flow charts respectively depicting the first and second halves of an exemplary operation of the first storage control arrangement of the operation information transmission control section 242.

According to the flow chart shown in FIG. 14, upon the startup switch SW being manually turned on (Yes in step Sb1), the GPS sensor 231 and the location detection section 232 (see FIG. 3) acquire the location information of the agricultural machine 110 and a date and time and store them in the location information storage section 233 (see FIG. 3) (step Sb2).

Next, the operation information of the agricultural machine 110 is detected at the output elements Q (step Sb3), and it is determined whether a timing has been reached in accordance with the predetermined intervals TA (in this example, TA=0.1 seconds) (step Sb4). If a timing has not been reached in accordance with the predetermined intervals TA (No in step Sb4), the process proceeds to step Sb3. On the other hand, if it is determined in step Sb4 that a timing has been reached in accordance with the predetermined intervals TA (Yes in step Sb4), the binary information and detected value information are acquired at the output elements (step Sb5), the maximum value Dmax and minimum value Dmin in the detected value information is updated in the third data storage section 263 (step Sb6) (see FIG. 9). One-minute average values AVA(1) to AV(k) of the detected value information are calculated and stored in the second data storage section 262 (step Sb7) (see FIG. 9). The turn-on count DTE1 and turn-on duration DTE2 in the contact point information and error presence/absence information are added and stored in the third data storage section 263 (step Sb8). The error codes and integrated time DS obtained upon a startup are stored in the third data storage section 283 (step Sb9).

Next, it is determined whether the startup switch SW has been manually turned off (step Sb10). If the startup switch SW has not been manually turned off (No in step Sb10), the process proceeds to step Sb3. On the other hand, if it is determined in step Sb10 that the startup switch SW has been manually turned off (Yes in step Sb10), the GPS sensor 231 and the location detection section 232 (see FIG. 3) acquire the location information of the agricultural machine 110 and a date and time and store them in the location information storage section 233 (see FIG. 6) (step Sb11), followed by the calculation of the average value AVB of the individual 1-minute average values AVA(1) to AV(k) stored in the second data storage section 262 and the storing of the average value AVB in the third data storage section 263 (step Sb12), as illustrated in FIG. 15.

Next, the integrated time DS obtained upon a shutdown is stored in the third data storage section 263 (step Sb13). The maximum value Dmax, minimum value Dmin, and average value AVB, the turn-on count DTE1 and turn-on duration DTE2 in the contact point information and error presence/absence information, and the error codes and integrated time DS obtained upon startups and shutdowns, all stored in the third data storage section 263, are transmitted to the remote monitoring device 130 (step Sb14), which ends the process. When the process is ended, the location information and date and time (see FIG. 6) obtained upon startups and shutdowns and stored in the location information storage section 233 are transmitted to the remote monitoring device 130.

Figure 16:
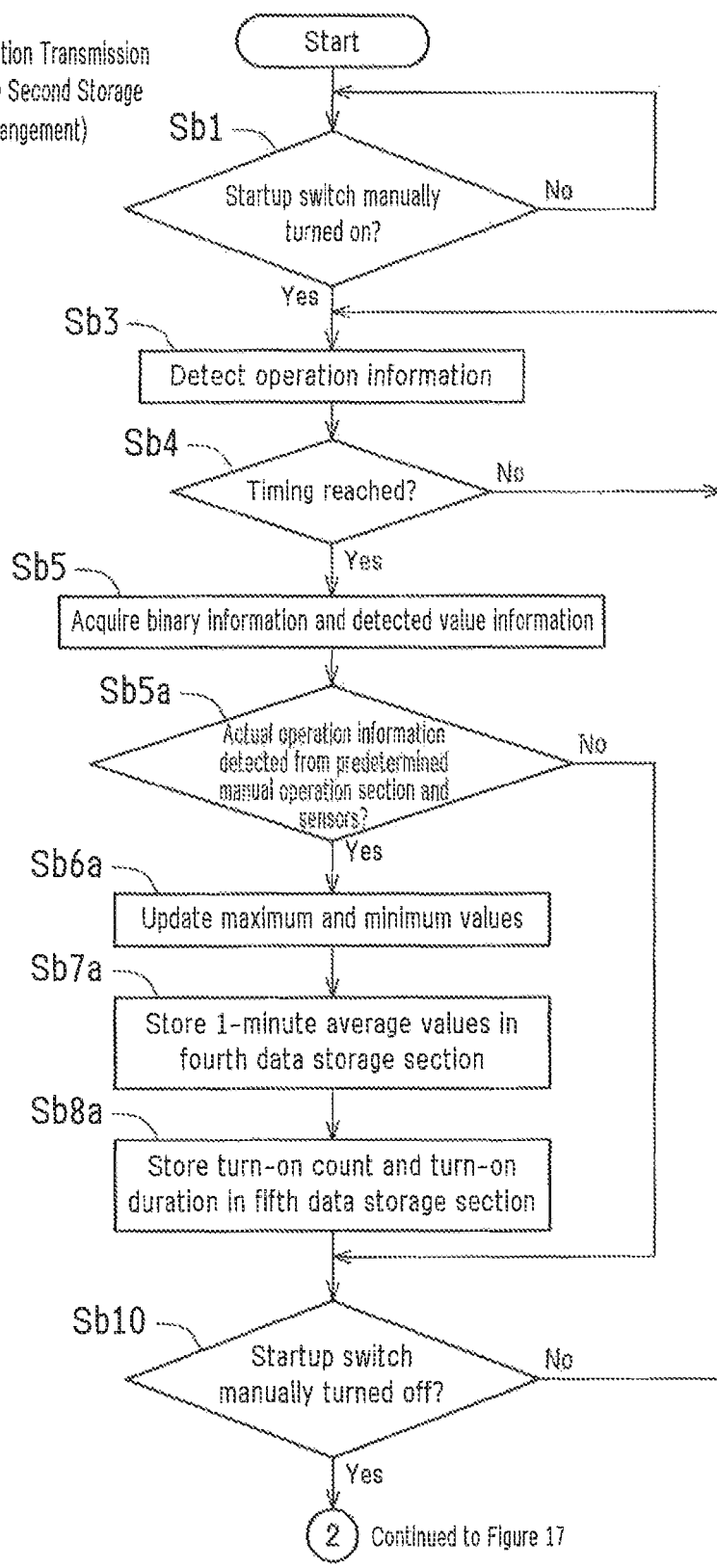
FIG. 16 is a flow chart depicting a first half of an exemplary operation of the second storage control arrangement of the operation information transmission control section.
Figure 17:
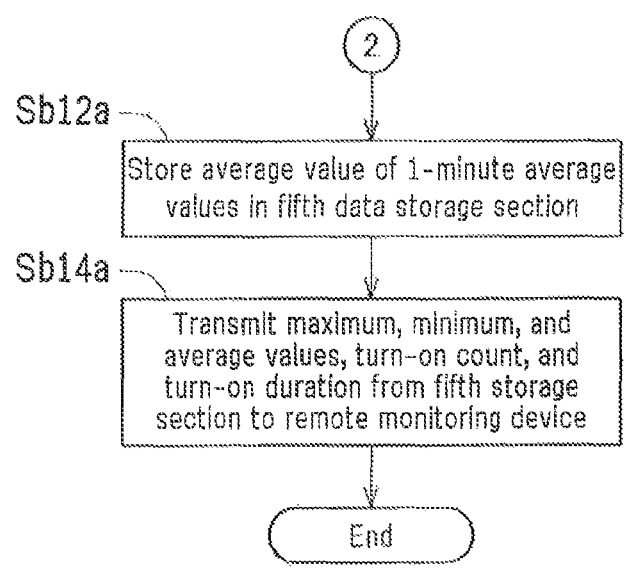
FIG. 17 is a flow chart depicting a second half of the exemplary operation of the second storage control arrangement of the operation information transmission control section.

FIGS. 16 and 17 are flow charts respectively depicting the first and second halves of an exemplary operation of the second storage control arrangement of the operation information transmission control section 242.

The flow charts shown in FIGS. 16 and 17 differ from the flow charts shown in FIGS. 14 and 15 in that: steps Sb2, Sb9, Sb11, and Sb13 are omitted; steps Sb6a to Sb8a, Sb12a, and Sb14a replace steps Sb6 to Sb8, Sb12, and Sb14; and step Sb5a is added between step Sb5 and step S6a. The following will describe the flow charts shown in FIGS. 16 and 17, focusing on differences from those shown in FIGS. 14 and 15.

According to the flow charts shown in FIGS. 16 and 17, it is determined in step Sb5a whether actual operation information is detected in the data from the predetermined manual operation section and the various sensors, if actual operation information is detected (Yes in step Sb5a), the process proceeds to step Sb6a. On the other hand, if no actual operation information is detected (No in step Sb5a), the process proceeds to step Sb10.

In step Sb6a, the maximum value Dmax and minimum value Dmin in the detected value information is updated in the fifth data storage section 265 (see FIG. 10).

In step Sb7a, 1-minute average values AVA(1) to AV(k) of the detected value information are calculated and stored in the fourth data storage section 264 (see FIG. 10).

In step Sb8a, the turn-on count DTE1 and turn-on duration DTE2 in the contact point information and error presence/absence information are added and stored in the fifth data storage section 265.

In step Sb12a, an average value AVB of the individual 1-minute average values AVA(1) to ANT(k) stored in the fourth data storage section 264 is calculated and stored in the fifth data storage section 265.

In step Sb14a, the maximum value Dmax, minimum value Dmin, and average value AVB, as well as the turn-on count DTE1 and turn-on duration DTE2 in the contact point information and error presence/absence information, stored in the fifth data storage section 265 are transmitted to the remote monitoring device 130.

When both the first and second storage control arrangements are activated, a combination of the process shown in FIGS. 14 and 15 and the process shown in FIGS. 16 and 17 can be implemented.

The operation information transmitting function described above enables transmission to the remote monitoring device 130 of the data needed to inform the user of the operation state, including the minimum, maximum, average values, and integrated information of the data on the operation state of the agricultural machine 110 collected over a period from a startup to the latest data acquisition, and the occurrence count and durations of a predetermined event, when the startup switch SW of the agricultural machine 110 is manually turned off. Therefore, the user is capable of being informed of the operation state, including the maximum, minimum, and average values for each sensor of the agricultural machine 110 and the turn-on count of the switch of the agricultural machine 110. Accordingly, the user is enabled to exploit the stored information to manage the operation of the agricultural machine 110 over an extended period of time (e.g., daily job reports, scheduled maintenance, information on actual use in the field, and diagnosis of parts through analysis of long-term data (aging degradation)). In addition, because the operation information, which is an abridged version of the detected value information, such as the maximum, minimum, and average values, the occurrence count and durations of an event, and the integrated information, is transmitted to the remote monitoring device 130 under the control of the operation information transmission control section 242, data can be easily collected in the remote monitoring device 130 for analysis. Another advantage is reduction of the storage capacity of a storage section (not shown) in the remote monitoring device 130 and of the communications load on the communications network 140.

Besides, since the operation information transmission control section 242 includes the second storage control arrangement, the minimum, maximum, and average values of actual operation data and the occurrence count and durations of a predetermined event can be transmitted to the remote monitoring device 130. Therefore, the user is capable of being informed of minimum, maximum, and average values of a particular type of data on a running state or a particular one of predetermined manual operation sections and various sensors related to actual operation and an occurrence count and durations of a predetermined event.

Furthermore, in the present embodiment, since at least either one of the first and second storage control arrangements is activated on the basis of the operation selection specified on the setup section 242h, the data obtained from at least either one of the first and second storage control arrangements can be transmitted to the remote monitoring device 130 according to one of the first and second storage control arrangements specified for each type of data on the operation state. Thus, efficiency in operation and transmission can be more readily improved.

Other Embodiments

The remote monitoring system 100 in accordance with the present embodiment has been described as being applicable to combine harvesters, tillers, rice transplanters, or like mobile work vehicles. The remote monitoring system 100 is by no means limited to these applications and also preferably applicable to mobile work machines, such as tractors, excavators, wheel loaders, carriers, and like construction work machinery, and vessels, such as pleasure crafts and fishing boats.

The present invention is by no means limited to the embodiments described above and may be implemented in various forms. Therefore, the embodiments are for illustrative purposes only in every respect and should not be subjected to any restrictive interpretations. The scope of the present invention is defined only by the claims and never bound by the specification. Those modifications and variations that may lead to equivalents of claimed elements are all included within the scope of the invention.

INDUSTRIAL APPLICABILITY

The present invention relates to a remote monitoring terminal device for mobile work vehicles (e.g., construction and agricultural machinery) or vessels (e.g., pleasure crafts and fishing boats), the remote monitoring terminal device being mounted to such a mobile work vehicle or vessel for communication with a remote monitoring device to enable the mobile work vehicle or vessel to be remotely monitored by the remote monitoring device. The present invention is applicable, especially, to inform the user of maximum, minimum, and average values for each sensor and a turn-on count of a switch.

REFERENCE SIGNS LIST

100 Remote Monitoring System
110 Agricultural Machine (Exemplary Mobile Work Vehicle)
120 Remote Monitoring Center
130 Remote Monitoring Device
140 Communications Network
200 Remote Monitoring Terminal Device
210 Communications Section
220 Power Supply Control Section
231 GPS Sensor (Exemplary Location Sensor)
232 Location Detection Section
233 Location Information Storage Section
240 Control Section
241 Startup Information Transmission Control Section
242 Operation Information Transmission Control Section (Exemplary Data Abridging Control Section)
242a Data Acquisition Section
242b First Data Storage Control Section
242c First Data Computation Section
242d Second Data Storage Control Section 242e Actual Operation Information Detection Section
242f Second Data Computation Section
242g Third Data Storage Control Section
242h Setup Section
242i Manual Turn-off Operation Receiving Section
242j Data Transmission Section
250 Processor Section
260 Storage Section (Exemplary Data Storage Section)
261 First Data Storage Section
262 Second Data Storage Section
263 Third Data Storage Section
264 Fourth Data Storage Section
265 Fifth Data Storage Section
BT Battery
SW Startup Switch
T Connection Terminal
TA Predetermined Interval
TB Averaging Interval
TC Sampling Interval

The invention claimed is:

1. A remote monitoring terminal device for a mobile work vehicle or vessel, said remote monitoring terminal device being mounted to a mobile work vehicle or vessel for communication with a remote monitoring device to enable the mobile work vehicle or vessel to be remotely monitored by the remote monitoring device, said remote monitoring terminal device comprising:
    connection terminals for feeding data on an operation state of the mobile work vehicle or vessel;
    a data abridging control section including a first storage control arrangement and a second storage control arrangement,
        said first storage control arrangement acquiring at predetermined intervals, and temporarily storing in a data storage section, the data on the operation state fed via the connection terminals, computing minimum, maximum, and average values of part of the data on the operation state collected over a period from a startup to a latest data acquisition and an occurrence count and durations of a predetermined event, all on the basis of the data stored at the predetermined intervals, and temporarily storing the computed minimum, maximum, and average values and the computed occurrence count and durations in the data storage section,
        said second storage control arrangement computing minimum, maximum, and average values of actual operation data and an occurrence count and durations of the predetermined event on the basis of the data temporarily stored in the data storage section at the predetermined intervals, and temporarily storing the computed minimum, maximum, and average values and the computed occurrence count and durations in the data storage section, the actual operation data being part of the data on the operation state collected over a period from a startup to a latest data acquisition, the part being related to actual operation; and
    a communications section for communication with the remote monitoring device,
    wherein the data abridging control section transmits the minimum, maximum, and average values and the occurrence count and durations of the predetermined event, all stored in the data storage section, to the remote monitoring device via the communications section in response to a manual turn-off of a startup switch of the mobile work vehicle or vessel.

2. The remote monitoring terminal device as set forth in claim 1, wherein
    the data abridging control section specifies, for each type of data on the operation state, an operation selection as to whether the first storage control arrangement is activated alone from the first and second storage control arrangements, the second storage control arrangement is activated alone, or both the first and second storage control arrangements are activated, and activates at least either one of the first and second storage control arrangements on the basis of the specified operation selection.

* * * * *